(12) United States Patent
Meier

(10) Patent No.: US 11,844,295 B2
(45) Date of Patent: Dec. 19, 2023

(54) EARTH WORKING ROLLER

(71) Applicant: Hamm AG, Tirschenreuth (DE)

(72) Inventor: Matthias Meier, Tirschenreuth (DE)

(73) Assignee: HAMM AG, Tirschenreuth (DE)

( * ) Notice: Subject to any disclaimer, the term of this patent is extended or adjusted under 35 U.S.C. 154(b) by 346 days.

(21) Appl. No.: 17/173,690

(22) Filed: Feb. 11, 2021

(65) Prior Publication Data

US 2021/0161056 A1 Jun. 3, 2021

Related U.S. Application Data

(62) Division of application No. 16/217,633, filed on Dec. 12, 2018, now Pat. No. 11,006,562.

(30) Foreign Application Priority Data

Dec. 14, 2017 (DE) ...................... 10 2017 129 932.7

(51) Int. Cl.
| | |
|---|---|
| *A01B 29/04* | (2006.01) |
| *E01C 23/12* | (2006.01) |
| *E01C 19/26* | (2006.01) |
| *A01B 29/06* | (2006.01) |
| *E02D 3/026* | (2006.01) |

(52) U.S. Cl.
CPC ............ *A01B 29/048* (2013.01); *A01B 29/06* (2013.01); *E01C 19/266* (2013.01); *E01C 23/12* (2013.01); *E02D 3/0265* (2013.01)

(58) Field of Classification Search
CPC ..... A01B 29/048; A01B 29/06; E01C 19/266; E01C 23/12
See application file for complete search history.

(56) References Cited

U.S. PATENT DOCUMENTS

| | | |
|---|---|---|
| 557,006 A | 3/1896 | Miller |
| 2,678,593 A | 5/1954 | Hugman |
| 2,754,734 A | 7/1956 | Gardner |
| 2,811,912 A | 11/1957 | Howard |
| 3,832,079 A | 8/1974 | Moorhead |
| 3,899,030 A | 8/1975 | van der Lely et al. |
| 4,344,490 A | 8/1982 | van der Lely et al. |

(Continued)

FOREIGN PATENT DOCUMENTS

| | | |
|---|---|---|
| AU | 2016201595 | 9/2016 |
| CN | 204023365 | 12/2014 |

(Continued)

OTHER PUBLICATIONS

Office Action Chinese Serial No. 201811529442.X dated Oct. 22, 2020, 7 pages.

(Continued)

*Primary Examiner* — Tara Mayo
(74) *Attorney, Agent, or Firm* — RANKIN, HILL & CLARK LLP

(57) ABSTRACT

An earth working roller comprises a support structure (11), wherein to form a roller body (36) rotatable about a roller axis of rotation (A) on a radially outer region of the support structure (11), a plurality of first earth working units (30) is provided extending substantially in the direction of the roller axis of rotation (A) and/or a plurality of second earth working units (38) is provided extending substantially in the circumferential direction.

44 Claims, 14 Drawing Sheets

(56) References Cited

U.S. PATENT DOCUMENTS

Figure 1:
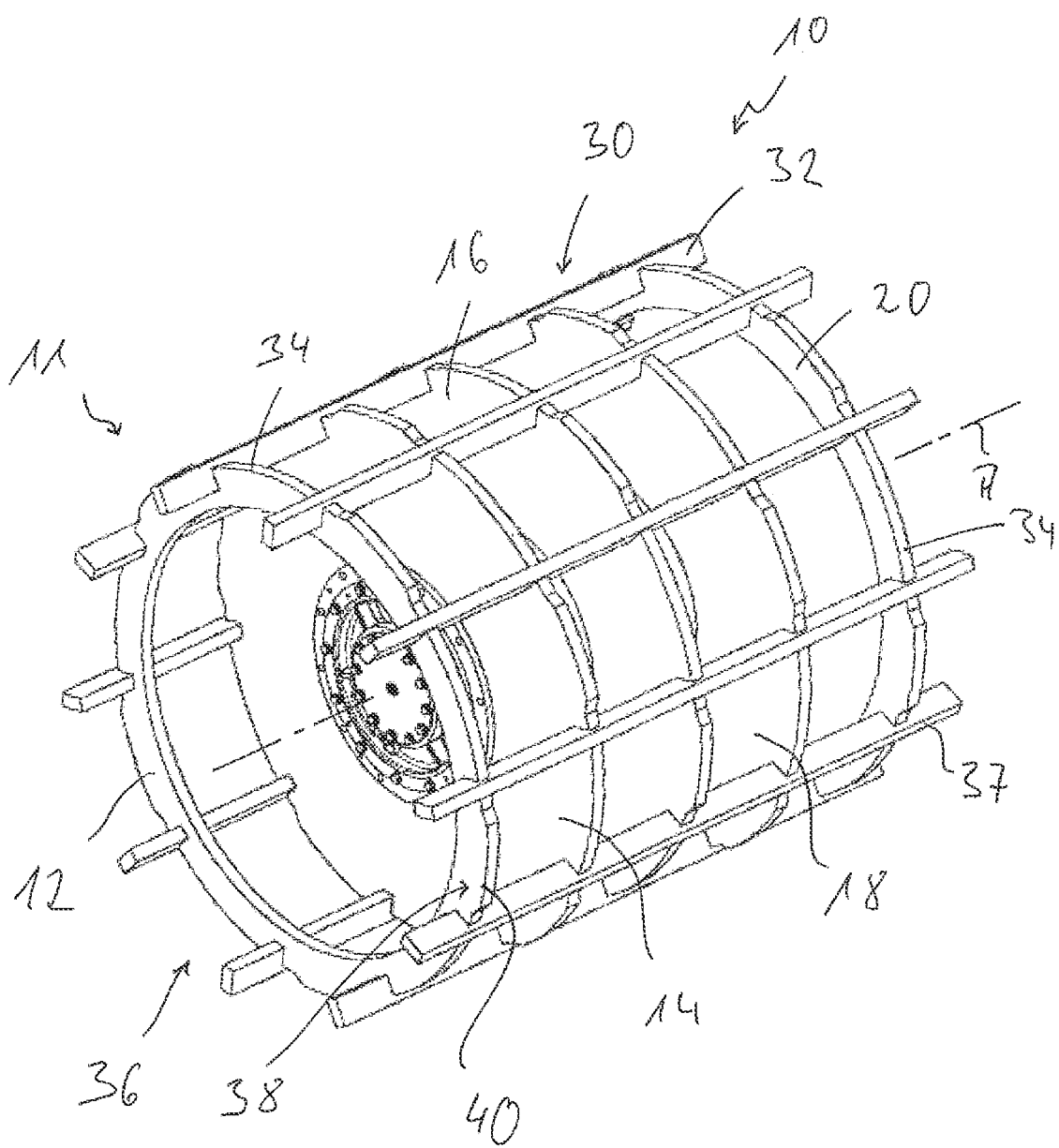

| | | |
|---|---|---|
| 5,421,670 A | 6/1995 | Meirick |
| 5,826,808 A | 10/1998 | Giovanardi |
| 6,763,896 B1 | 7/2004 | Hurtis |
| D698,830 S | 2/2014 | Westbrook et al. |
| 2006/0081383 A1 | 4/2006 | Dietrich, Sr. |
| 2006/0081384 A1 | 4/2006 | Dietrich, Sr. |
| 2009/0137373 A1 | 5/2009 | Juzva |
| 2010/0135724 A1 | 6/2010 | Roth |
| 2013/0062084 A1 | 3/2013 | Casper et al. |
| 2014/0251646 A1 | 9/2014 | Gray et al. |
| 2018/0206386 A1 | 7/2018 | Bell et al. |

FOREIGN PATENT DOCUMENTS

| | | | |
|---|---|---|---|
| CN | 107304541 | 10/2017 | |
| CN | 209703244 | 11/2019 | |
| DE | 7621875 | 11/1976 | |
| DE | 8803902 | 9/1988 | |
| DE | 102013006321 | 10/2014 | |
| DE | 202014106031 | 3/2016 | |
| EP | 0004550 A2 * | 2/1979 | ............ A01B 29/06 |
| JP | 36-000581 | 2/1961 | |
| JP | 55-113707 | 8/1980 | |
| JP | 2001146737 | 5/2001 | |
| WO | WO2000078121 | 12/2000 | |
| WO | WO03090516 | 11/2003 | |

OTHER PUBLICATIONS

Partial Search Report of European Application No. EP18211455 dated May 6, 2019, 15 pages.

German Search Report for German application No. 10 2017 129 932.7, dated Sep. 17, 2018; 10 pages.

Japanese Office Action for Japanese Patent Application No. 2018-233401, dated Jan. 14, 2020, 14 pages.

Office Action of U.S. Appl. No. 17/173,760 dated Jun. 2, 2023, 19 pages.

Notice of Allowance of U.S. Appl. No. 17/173,760 dated Sep. 5, 2023, 7 pages.

\* cited by examiner

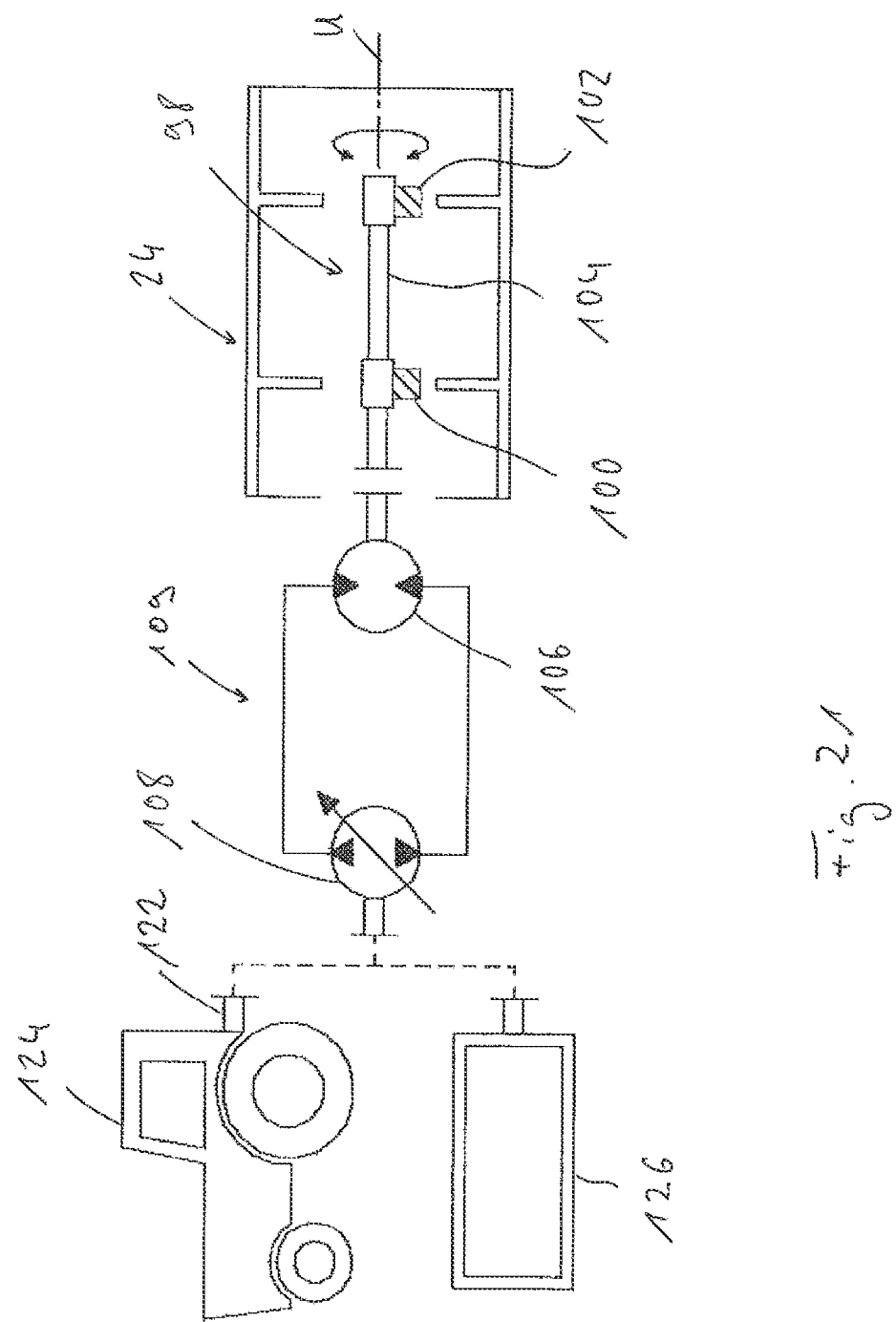

EARTH WORKING ROLLER

The present invention relates to an earth working roller, which may be used, in particular to fracture a solid substrate, for example, a concrete substrate. Earth working rollers of this type are also generally designated as crushing rollers.

A self-propelled earth working machine with an earth working roller designed as a crushing roller is known from U.S. Pat. No. 4,523,873. The earth working roller of this known earth working machine comprises a cylindrical roller shell, which is mounted on a machine frame to be rotatable about a roller axis of rotation via a support structure provided in the interior of the roller shell. Multiple rows of earth working projections extending circumferentially in a zig-zag pattern are provided on the outer face of the roller shell.

DE 10 2013 208 261 A1 discloses an earth working roller in which earth working projections projecting beyond the outer periphery of the roller shell and annularly surrounding the same are provided on the outer periphery of a substantially cylindrical roller shell.

EP 3 031 526 B1 discloses a rotor for crushing stone which is usable in an impact mill. The rotor has approximately quadratic support disks on its two axial end regions, between which beater bars, provided for crushing stone, extend projecting radially outward.

It is the object of the present invention to provide an earth working roller for an earth working machine which provides an improved efficiency for earth working in a structurally simple design.

According to the invention, this problem is solved by an earth working roller comprising a support structure, wherein a plurality of first earth working units is provided extending substantially in the direction of the roller axis of rotation and/or a plurality of second earth working units extending substantially in the circumferential direction is provided on a radially outer region of the support structure to form a roller body rotatable about a roller axis of rotation.

The earth working roller structured according to the invention comprises, unlike earth working rollers known from the prior art, no roller shell substantially closing off the earth working bars in the radially outward direction. Due to the structure of the roller body comprising a support structure, for example, comprising a plurality of support disks or support struts and the earth working units provided thereon, a skeleton-like, basically radially outwardly open structure of the roller body is achieved. This structure is inherently basically very stiff, so that it is therefore able to bear the high footprint weight of an earth working machine necessary for crushing substrates, for example, concrete material, yet itself has a comparatively low mass. This is then particularly substantially advantageous if a vibration generating mechanism is assigned to this type of earth working roller, by means of which the earth working roller may be set into vibration to improve the crushing of the substrate.

In particular, it is hereby provided that the roller body is substantially designed as open radially outwardly in the outer peripheral region of the support disks.

As already stated, a plurality of support disks arranged consecutively in the direction of a roller axis of rotation and connected to one another may be provided to form a roller body, wherein [a] plurality of first earth working units extending substantially in the direction of the roller axis of rotation is provided on an outer peripheral region of at least one part of the support disks and/or the plurality of second earth working units extending substantially in the circumferential direction is provided on an outer peripheral region of at least one part of the support disks.

To support a rolling movement, the support disks may be designed with a substantially circular outer peripheral contour. Furthermore, at least a part of the support disks may comprise a plurality of support disk segments arranged spaced circumferentially apart from one another. This also contributes to a reduced total mass of the roller body.

In an alternative embodiment comprising a structure that likewise contributes to a low mass of the roller body, the support structure may comprise a plurality of support struts supporting in its radially outer region the plurality of first earth working units extending substantially in the direction of the roller axis of rotation and/or supporting the plurality of second earth working units extending substantially in the circumferential direction.

The support structure, for example, at least a part of the support disks, may be arranged surrounding a peripheral wall of a housing for a vibration generating mechanism.

For a compact, stable structure, it is proposed that the support disks arranged surrounding the peripheral wall be fixedly connected to the peripheral wall, and/or that in at least one axial end region of the roller body, at least one support disk is connected to the support disks arranged surrounding the peripheral wall by at least one part of the first earth working units, wherein it may be provided in an advantageous way that the support disks arranged surrounding the peripheral wall are fixedly connected to the peripheral wall by welding.

To generate an oscillating movement, for example, a vibration, thus an oscillating movement substantially orthogonal to the roller axis of rotation, overlapping a rolling movement of the earth working roller, it is proposed that a vibration generating mechanism with at least one unbalanced mass rotatable about an unbalanced axis of rotation is arranged in the housing, and/or that the housing is closed by an end wall in at least one axial end region, wherein the unbalanced axis of rotation preferably substantially corresponds to the roller axis of rotation, and/or an unbalanced drive motor, assigned to the at least one unbalanced mass, is mounted on an end wall.

An easy to manufacture, particularly stable structure may be achieved if at least one first earth working unit comprises an earth working bar fixedly connected to the support structure, for example, to at least one part of the support disks. Since according to the invention, the roller body comprises no roller shell on the outer peripheral region of the support structure, for example, of the support disks, the first earth working units or, in this embodiment the earth working bars, may themselves be directly mounted on the support structure designed as open, for example, as skeletal.

Advantageously, it may thereby be provided that each first earth working unit comprises an earth working bar, and/or that a plurality of earth working bars are arranged spaced circumferentially apart from one another.

Insofar as the support structure comprises support disks, that the at least one earth working bar is fixedly connected to all support disks, and/or that the at least one earth working bar is fixedly connected to at least one part of the support disks by welding.

To maintain a variable structure, easily renovated by welding, it is proposed that at least one first earth working unit comprises a tool carrier fixedly connected to at least one part of the support disks, and that an earth working tool is detachably connected or connectable to at least one tool carrier. Since in this structure, the tools used for working the ground are basically detachably connected to a respective tool carrier, different tools may be easily mounted on the roller body. Worn tools may be easily exchanged for new tools.

It may thereby be advantageously provided that each first earth working unit comprises a tool carrier, and/or that at least one tool carrier has a concave contour with respect to the outer periphery of the roller body, and/or that a plurality of tool carriers is arranged spaced circumferentially apart from one another.

In the embodiment of the support structure comprising support disks, the at least one tool carrier may be fixedly connected to each support disk, and/or the at least one tool carrier may be fixedly connected to at least one part of the support disks by welding.

For example, at least one earth working tool may be designed as an earth working bar. An earth working bar of this type then extends substantially parallel to the roller axis of rotation and may then cause a crushing of the substrate, when it strikes the substrate to be processed in the course of the rotation and thereby of the forward movement of the earth working roller, due to the forces abruptly introduced into the substrate.

For a stable connection of an earth working bar on a respective tool carrier, it is proposed that the earth working bar comprises a socket region designed for securing on a tool carrier and an earth working region projecting radially outward from the socket region in the case of [an] earth working tool mounted on a tool carrier.

A stable, yet easy to detach connection may be achieved in that at least one earth working tool is connected or connectable by screwing to its socket region and/or by clamping to a tool carrier.

In another embodiment, at least one earth working tool may comprise an earth working shell connected or connectable to at least two tool carriers, positioned or positionable in a peripheral region radially outwardly surrounding the support structure, for example, at least a part of the support disks optionally forming the support structure.

In order to thereby achieve a closed, easily realized structure of the earth working roller, it is proposed that a plurality of earth working shells consecutively following one another in the circumferential direction is connected or connectable to a tool carrier in both peripheral end regions.

If the support structure comprises support disks, it may be provided that at least one earth working shell is positioned or positionable in a peripheral region radially outwardly surrounding all support disks.

Furthermore, at least one earth working shell may be connected or connectable to the at least two tool carriers by screwing.

While this type of earth working shell may be designed as substantially smooth on its outer periphery so that an earth working roller thus designed may basically also be used as a compacting roller of a soil compactor, it may basically also be provided that at least one roller tool is mounted on at least one earth working shell. Thus, it is possible, in particular, to also provide one or more roller tools in axial regions between, for example, two support disks of the support structure.

In one embodiment advantageous with respect to weight, at least one earth working shell may be designed with a grid-like structure.

For example, it may be provided that at least one roller tool is mounted on each earth working shell, and/or that a plurality of roller tools is mounted on at least one earth working shell, and/or that at least one interchangeable holder is fixedly connected to at least one earth working shell and at least one roller tool is detachably connected or connectable to the at least one interchangeable holder.

At least one, preferably each roller tool may comprise a chisel. At least one, preferably each roller tool may also comprise a tamping foot.

For a stable connection of the earth working shells to the tool carriers provided on the outer periphery of the support disks, it is proposed that at least one earth working shell has in at least one peripheral end region a tool carrier engagement region adapted to a concave contour of a tool carrier.

At least one second earth working unit may comprise on the support structure, for example, on at least one support disk, at least one earth working projection projecting radially outward between at least two first earth working units consecutively following one another in the circumferential direction. In this case as well, a direct connection of the second earth working unit to the support disks is provided.

In particular, it may thereby be provided that at least one second earth working unit comprises at least one earth working projection on each support disk or on one or more similar components of the support structure.

It may additionally be provided that, for at least one second earth working unit, the at least one earth working projection has a circumferential spacing to the first earth working units accommodating this second earth working unit between themselves in the circumferential direction.

For an advantageous structure, in particular for crushing a solid substrate, it is proposed that, if the support structure comprises one or more support disks, then no second earth working unit is provided between at least two first earth working units consecutively following one another in the circumferential direction for at least one carrier disk. It may thereby additionally be provided, that, for at least one support disk, one second earth working unit is provided and no second earth working unit is provided in alternation between first earth working units consecutively following one another in the circumferential direction, and/or that, for support disks consecutively following one another in the direction of the roller axis of rotation, one second earth working unit is provided on one of the support disks and no second earth working unit is provided on the other support disk between first earth working units consecutively following one another in the circumferential direction.

A particularly stable, easily implemented structure may be achieved if at least one earth working projection forms an integral component of a support disk for at least one second earth working unit. Mounting separate components is thus not necessary.

For a structure easily adaptable to different working environments, it is proposed that at least one second earth working unit comprises at least one earth working projection carrier detachably connected or connectable to a support disk or to one or more similar components of the support structure.

This may be realized, for example, in that at least one second earth working unit comprises an earth working projection support portion on an outer peripheral region of a support disk or on one or more similar components of the support structure, and that an earth working projection carrier is connected or connectable to this support disk in the earth working projection support portion by screwing.

The present invention additionally relates to an earth working machine comprising at least one earth working roller designed according to the invention and mounted on a machine frame to be rotatable about the roller axis of rotation.

This type of earth working machine may be designed as a trailer machine which has no traction drive. Such an earth working machine may then be pulled or pushed by a towing machine, for example, a tractor, a bulldozer, or a soil compactor or the like, over the substrate to be processed.

In particular, if a vibration generating mechanism is then assigned to an earth working roller of this type of earth working machine, it may be provided that the earth working machine is hydraulically and/or mechanically coupled to a drive engine to provide the drive energy for a vibration generating mechanism provided in the at least one earth working roller. A mechanical coupling may be carried out, for example, by the mechanical coupling of the vibration generating mechanism to an auxiliary output shaft of a drive unit of the drive engine. A hydraulic coupling may be carried out by connecting to the hydraulic circuit of this type of drive engine.

In one alternative configuration, a drive unit may be provided on an earth working machine designed without its own traction drive to provide the drive energy for a vibration generating mechanism provided in the at least one earth working roller.

The earth working machine may alternatively designed as self-propelled and have a traction drive.

In this type of embodiment, a drive unit of the traction drive is provided to provide the drive energy for a vibration generating mechanism provided in the at least one earth working roller. Furthermore, a drive unit for the traction drive may be provided on the earth working machine, and a drive unit may be provided for the traction drive of a separately designed drive unit for the vibration generating mechanism of the at least one earth working roller.

Figure 2:
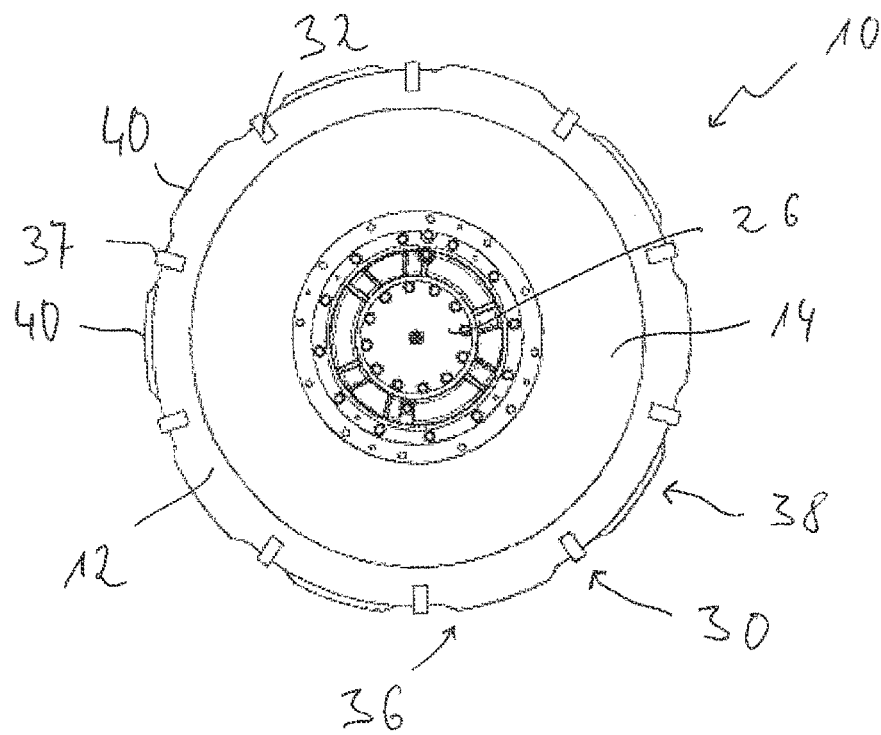
Figure 3:
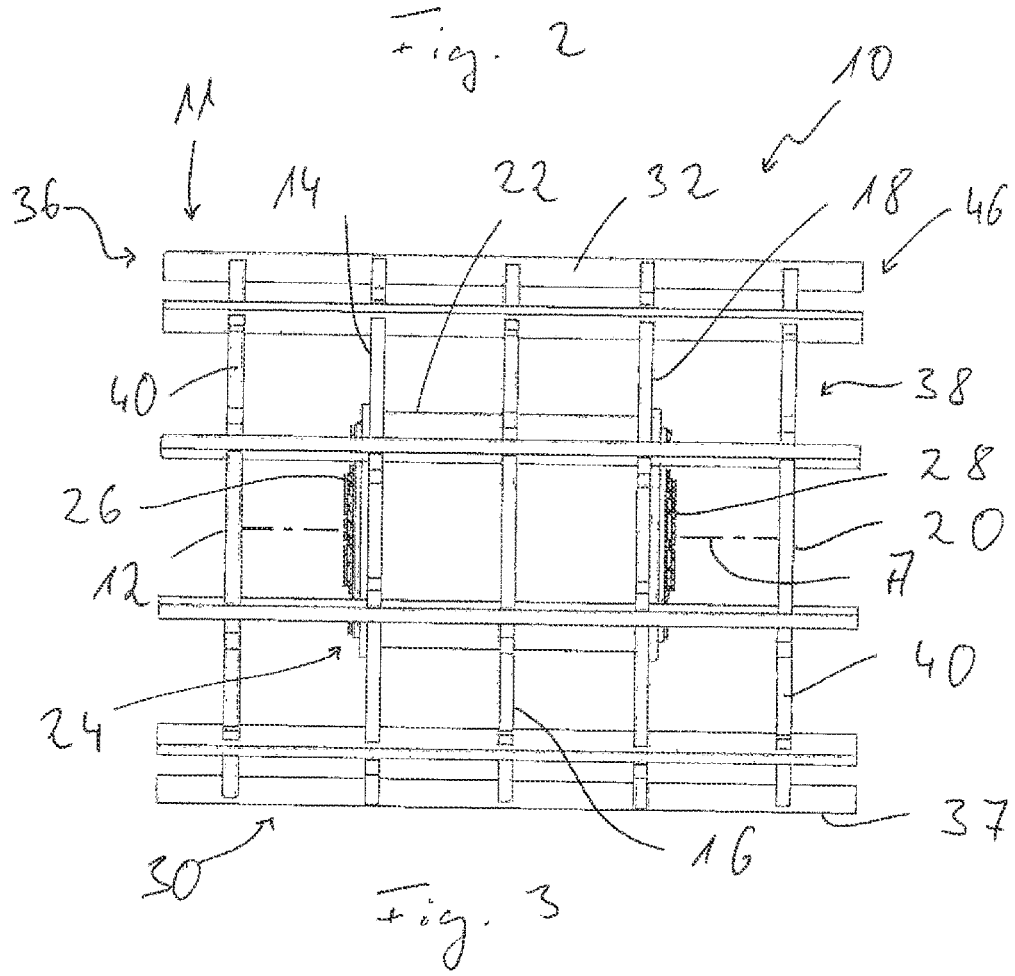
Figure 4:
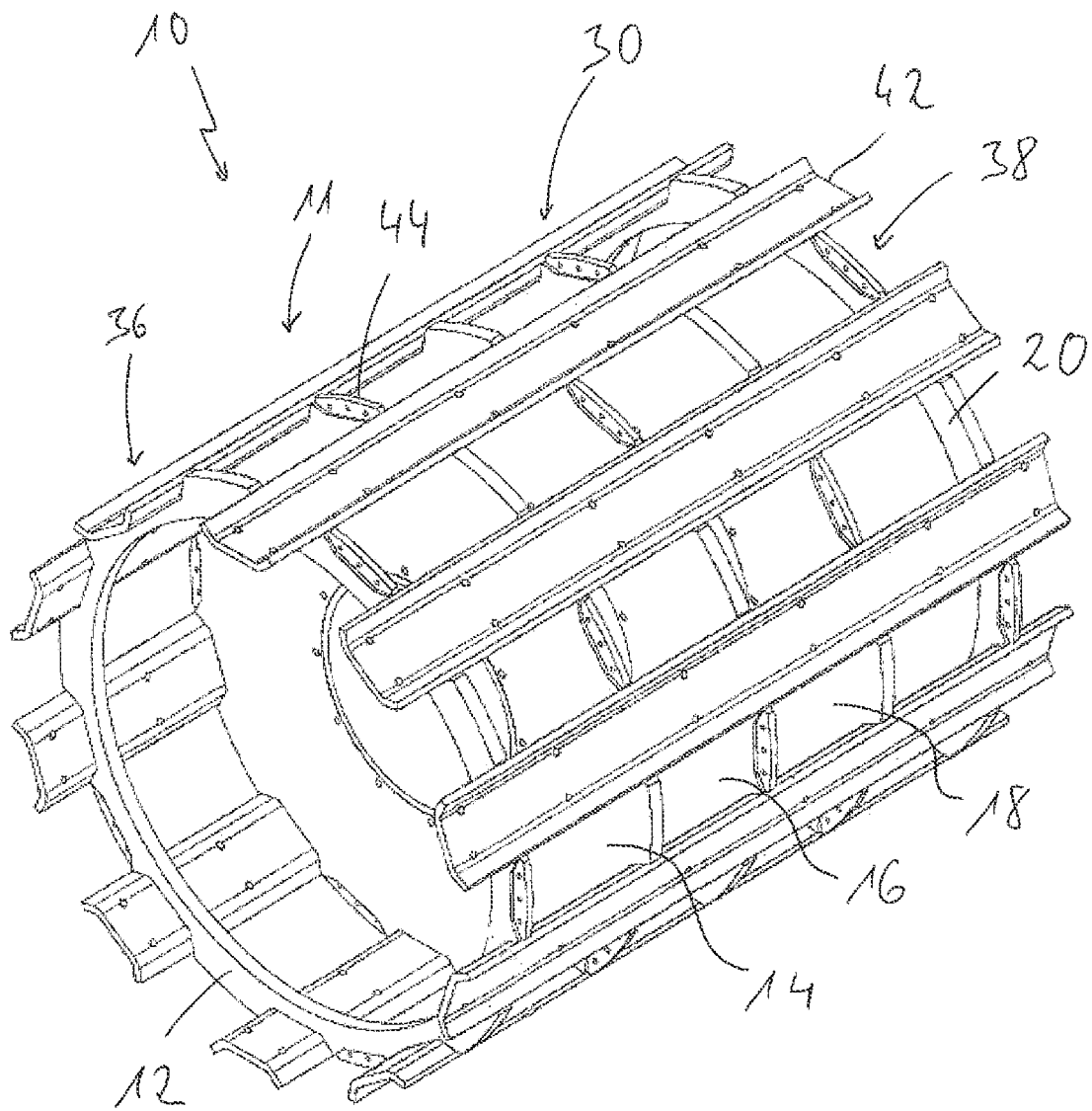
Figure 5:
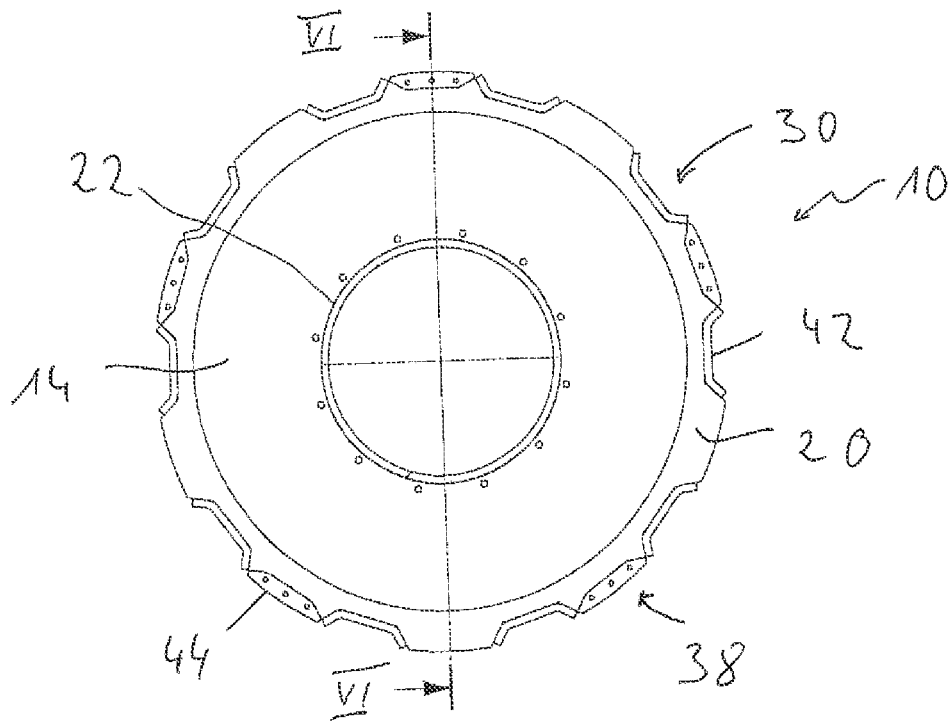
Figure 6:
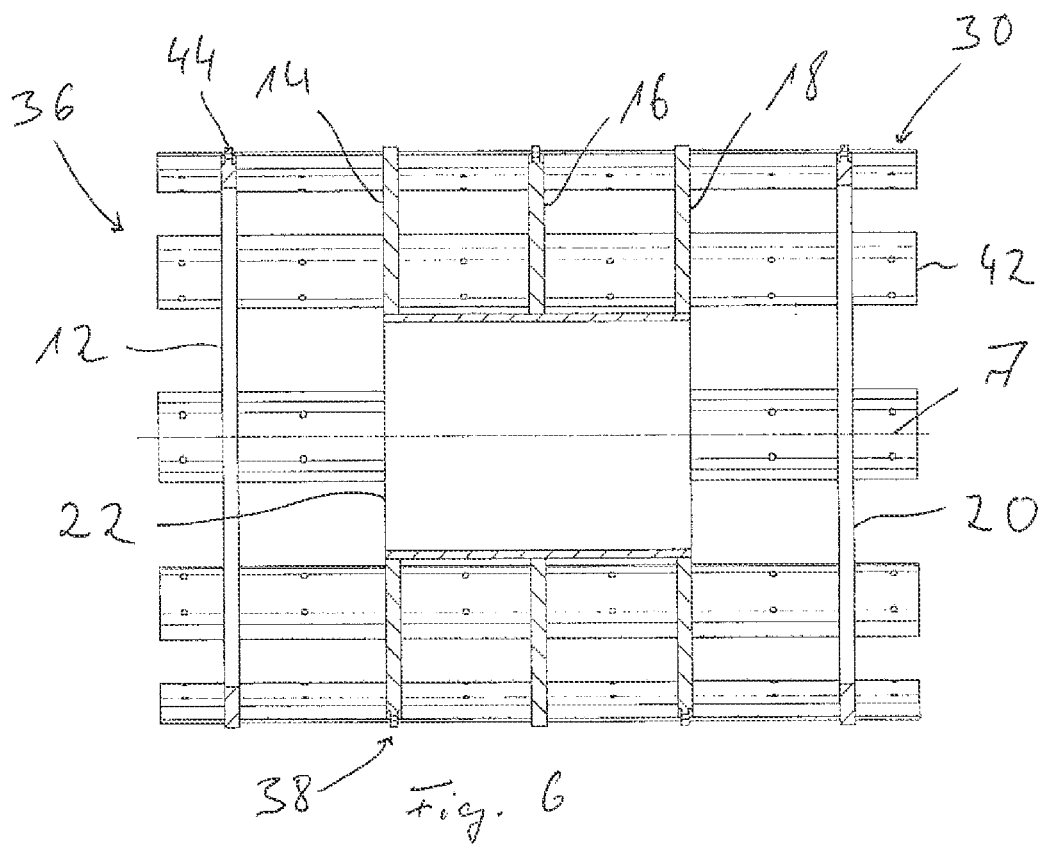
Figure 7:
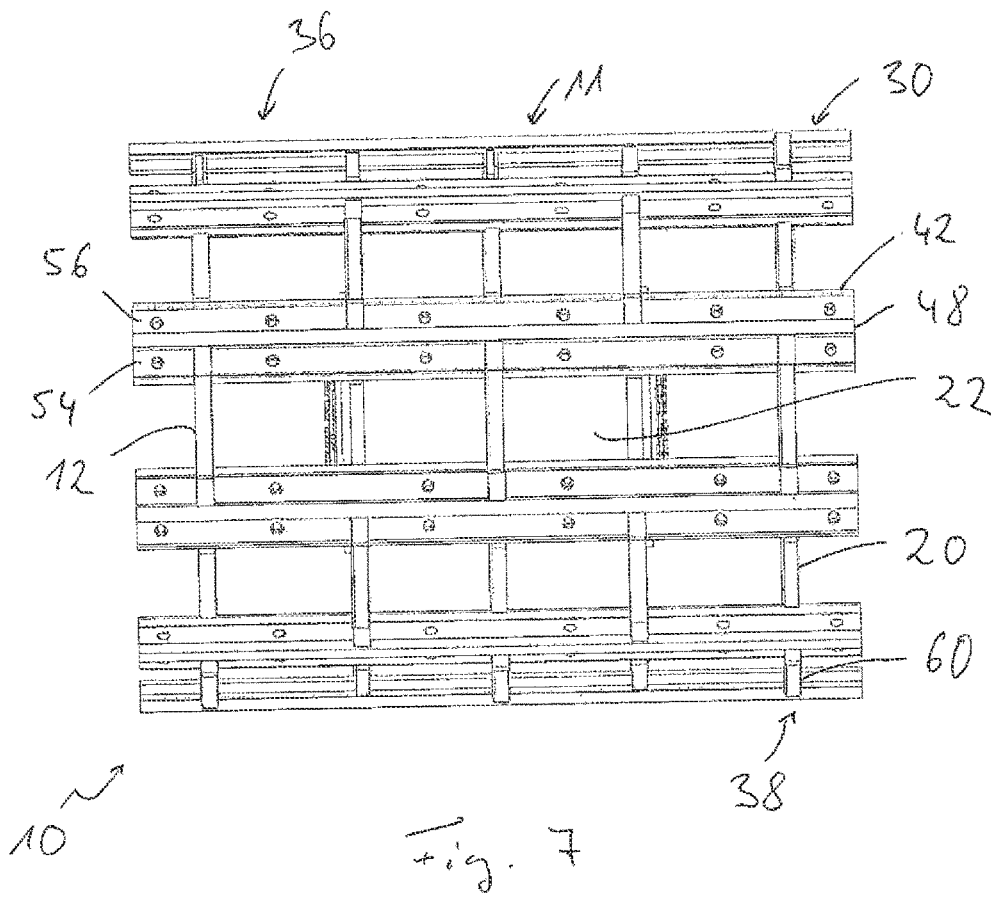
Figure 8:
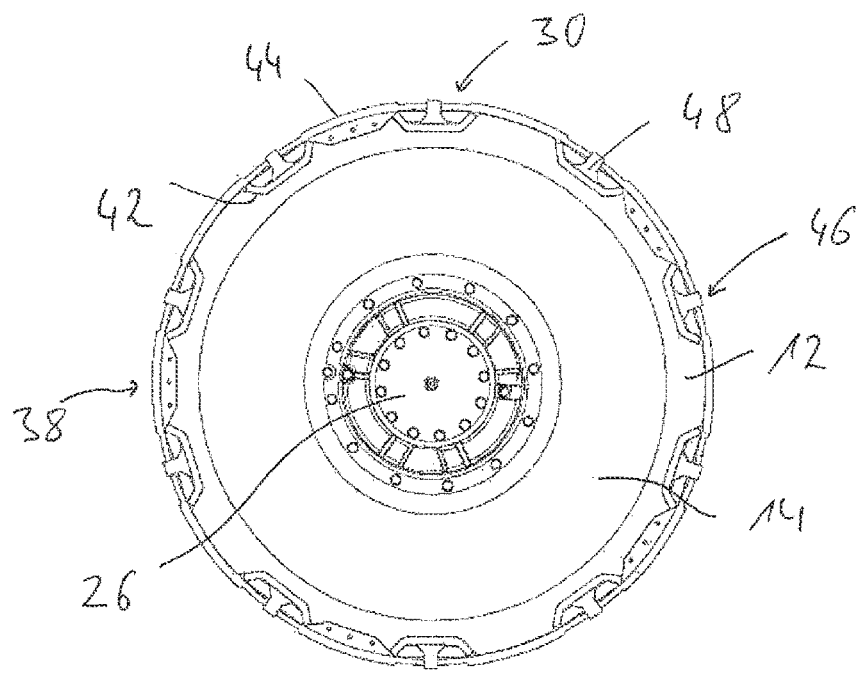
Figure 9:
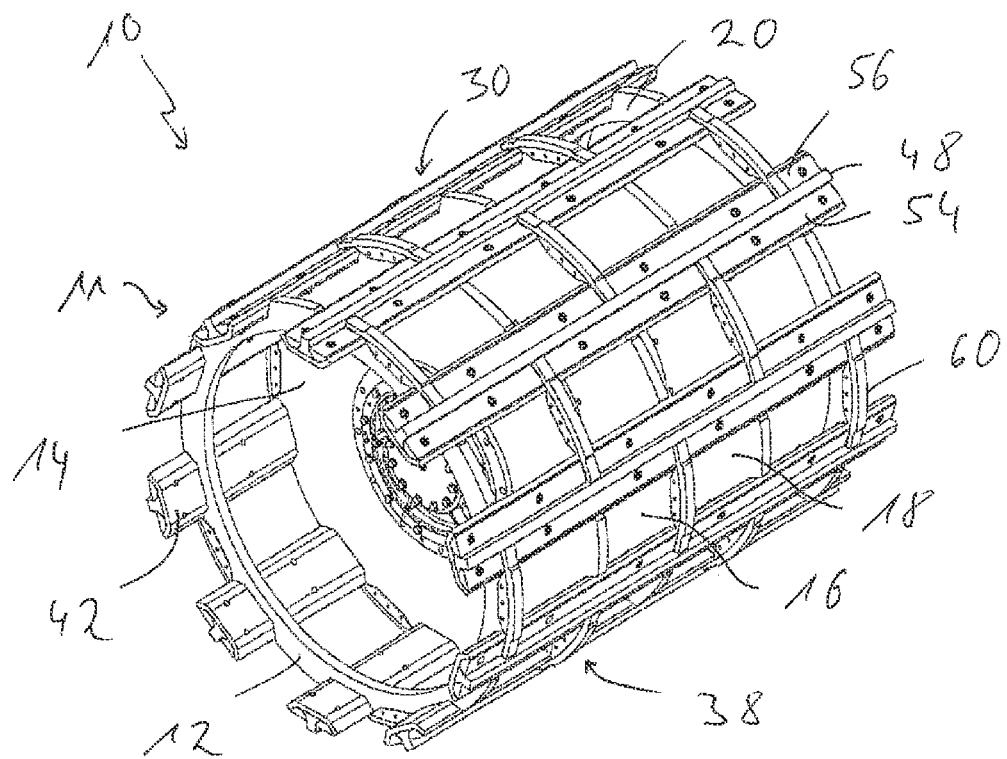
Figure 10:
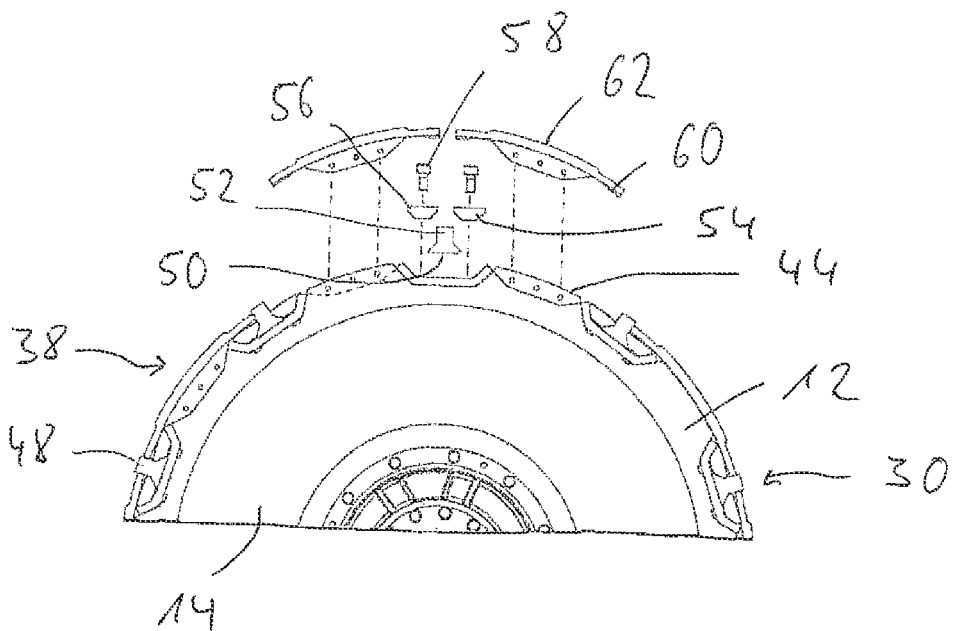
Figure 11:
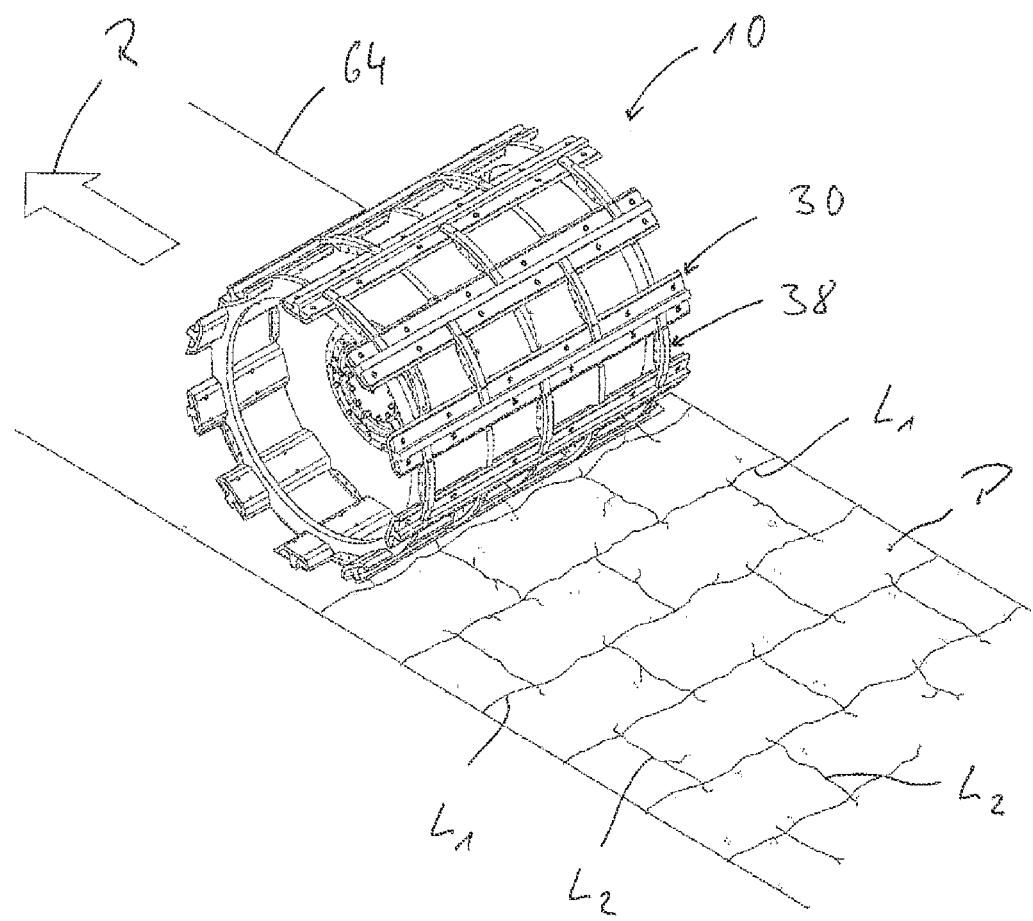
Figure 12:
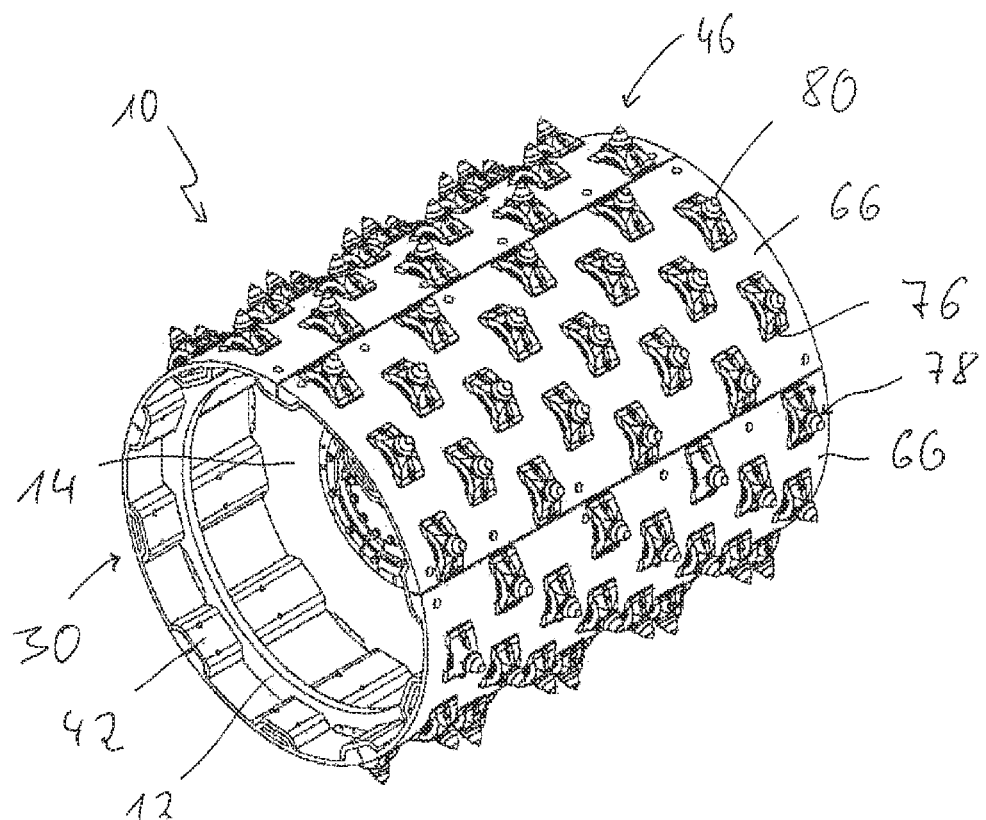
Figure 13:
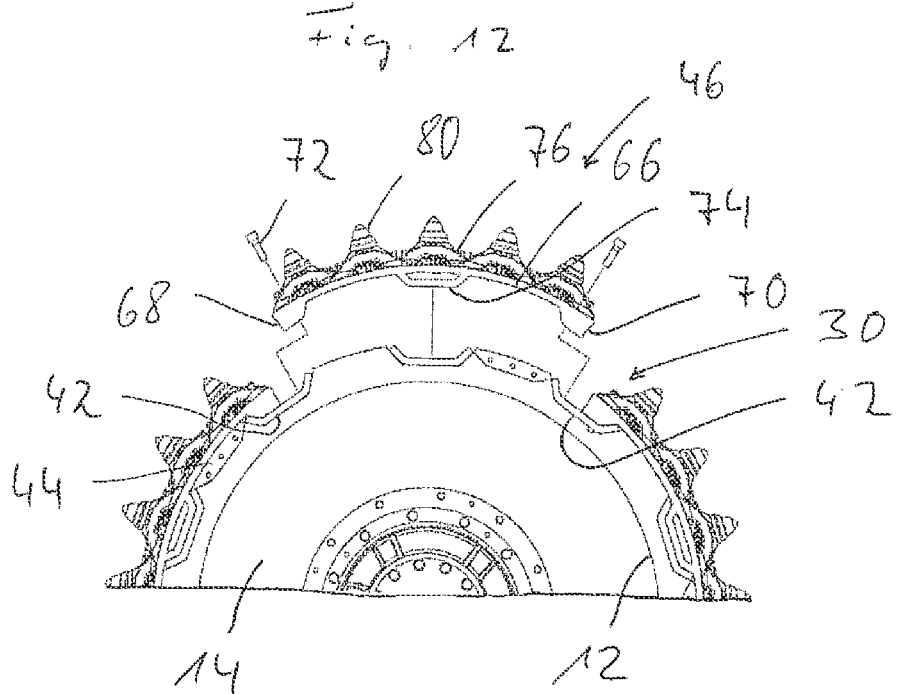
Figure 14:
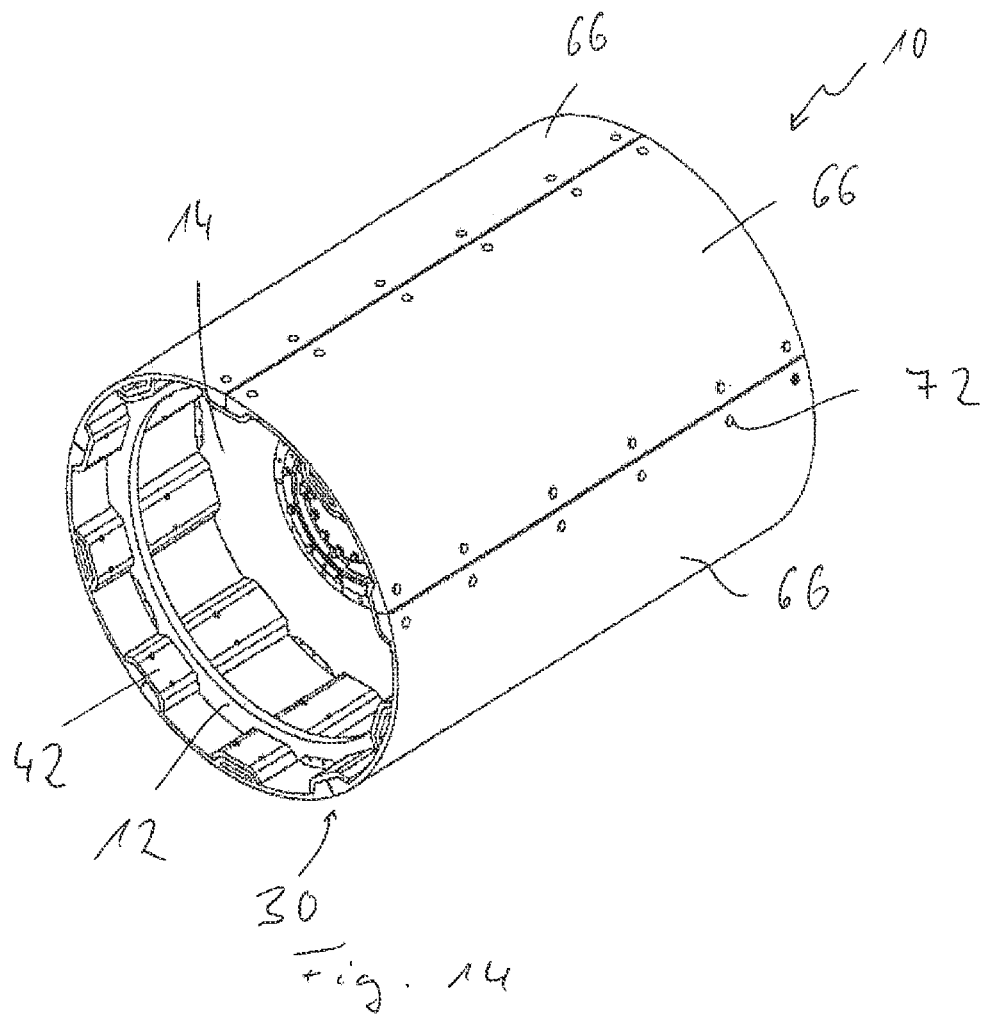
Figure 15:
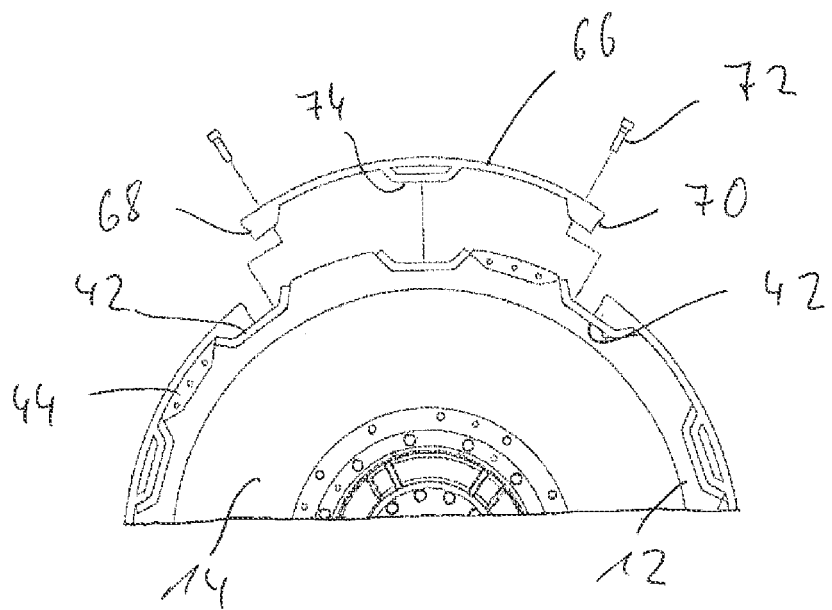
Figure 16:
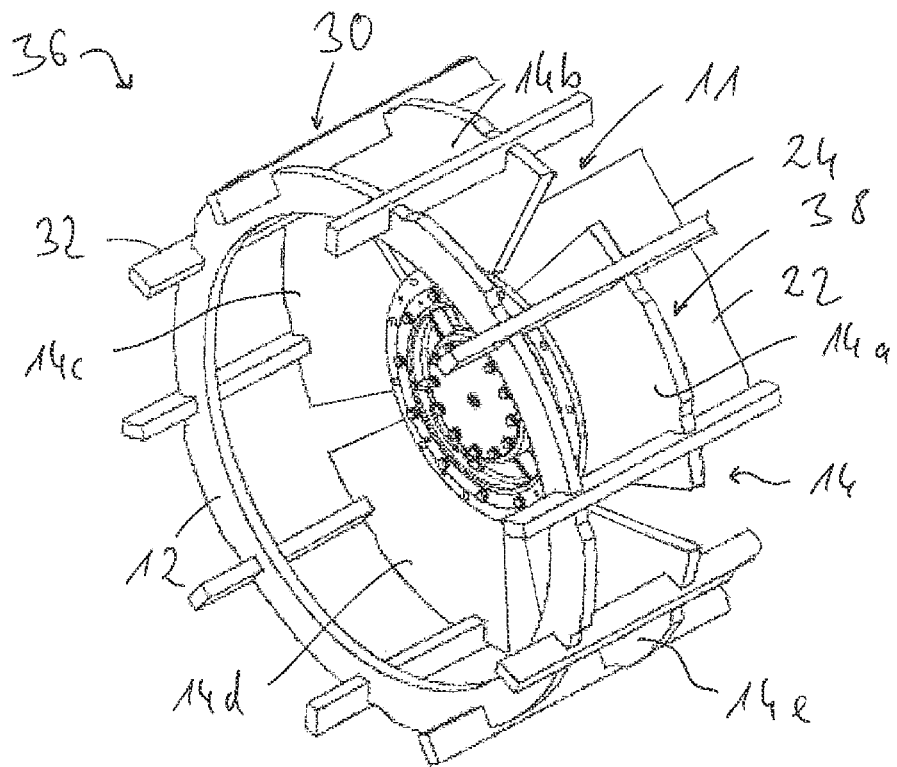
Figure 17:
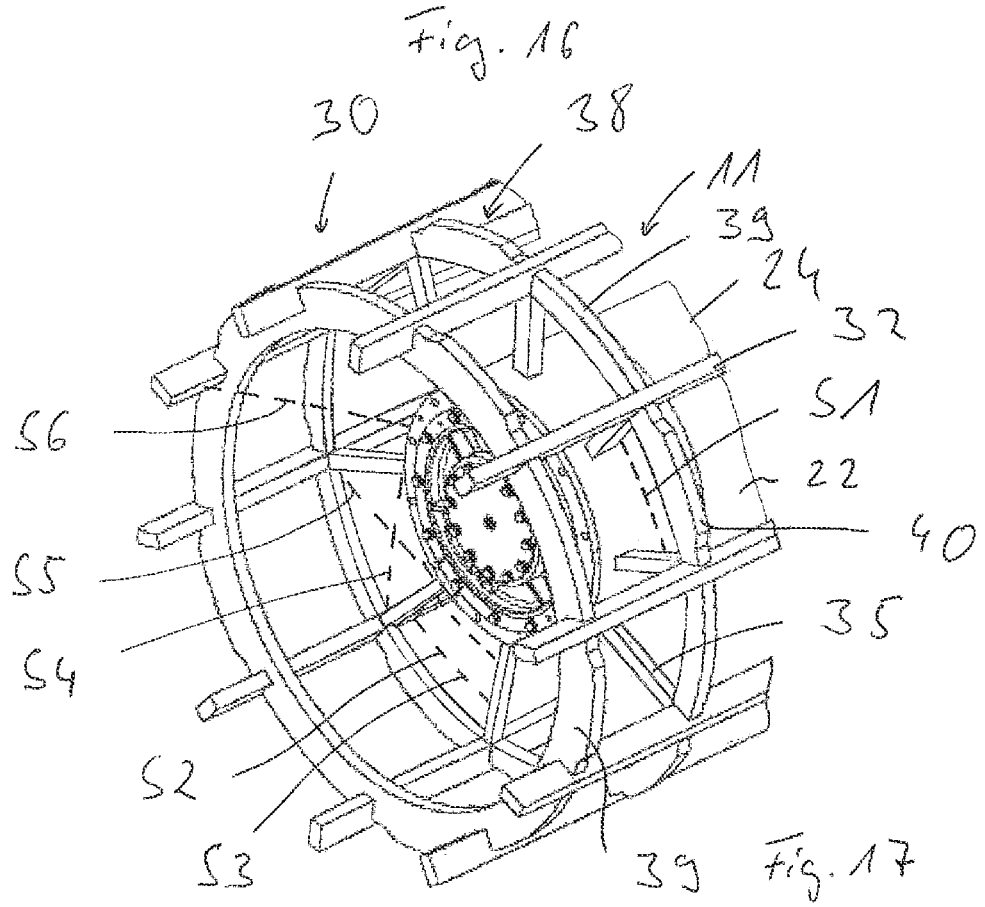
Figure 18:
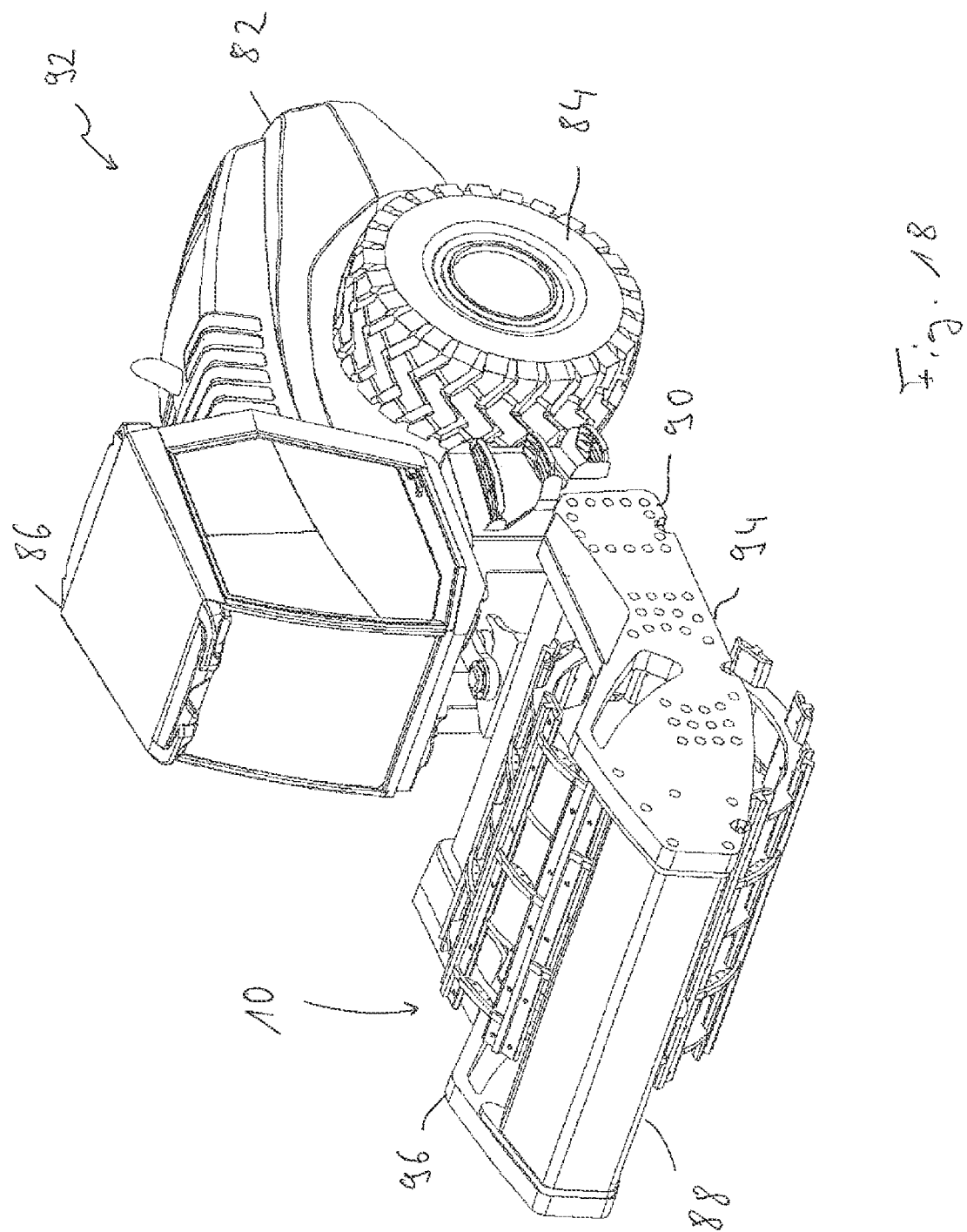
Figure 13:
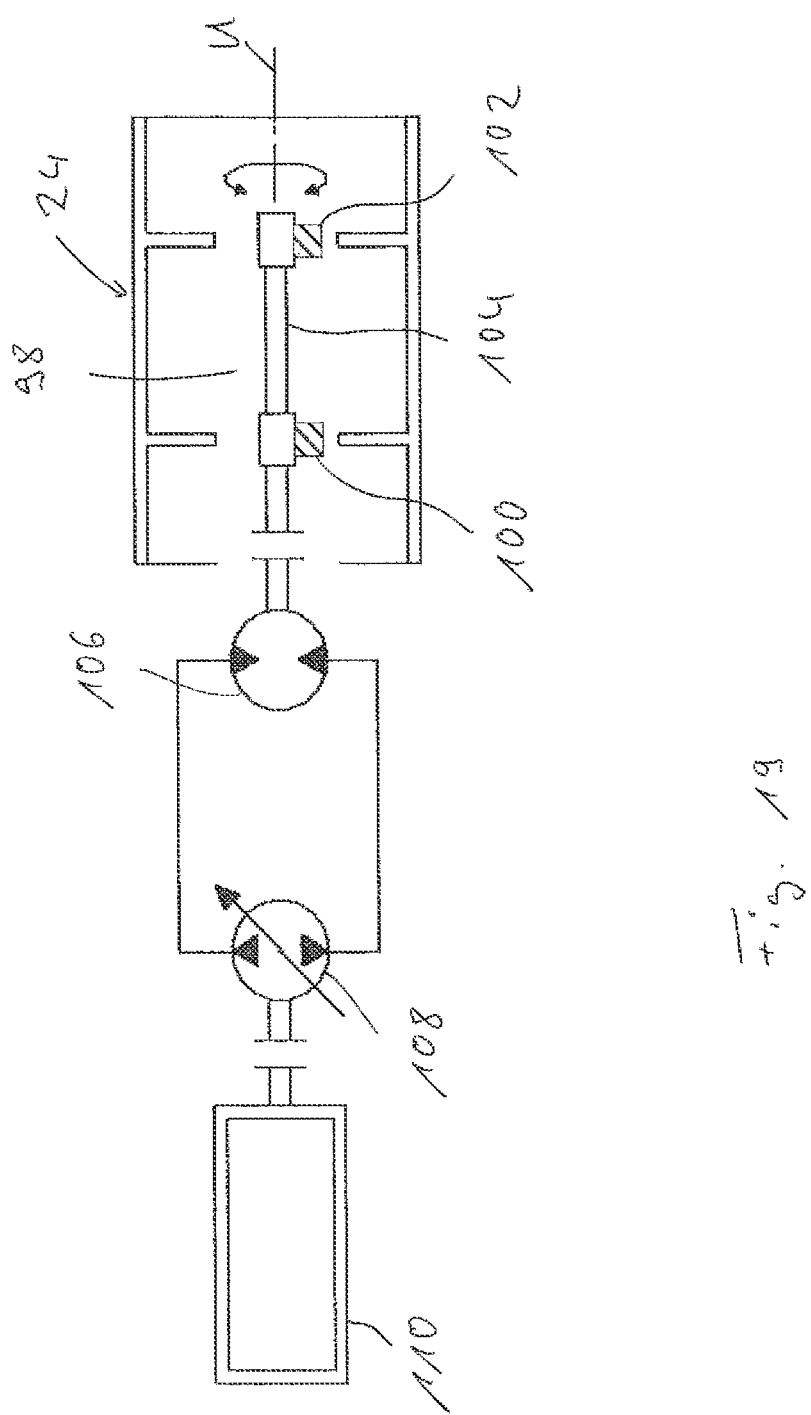
Figure 20:
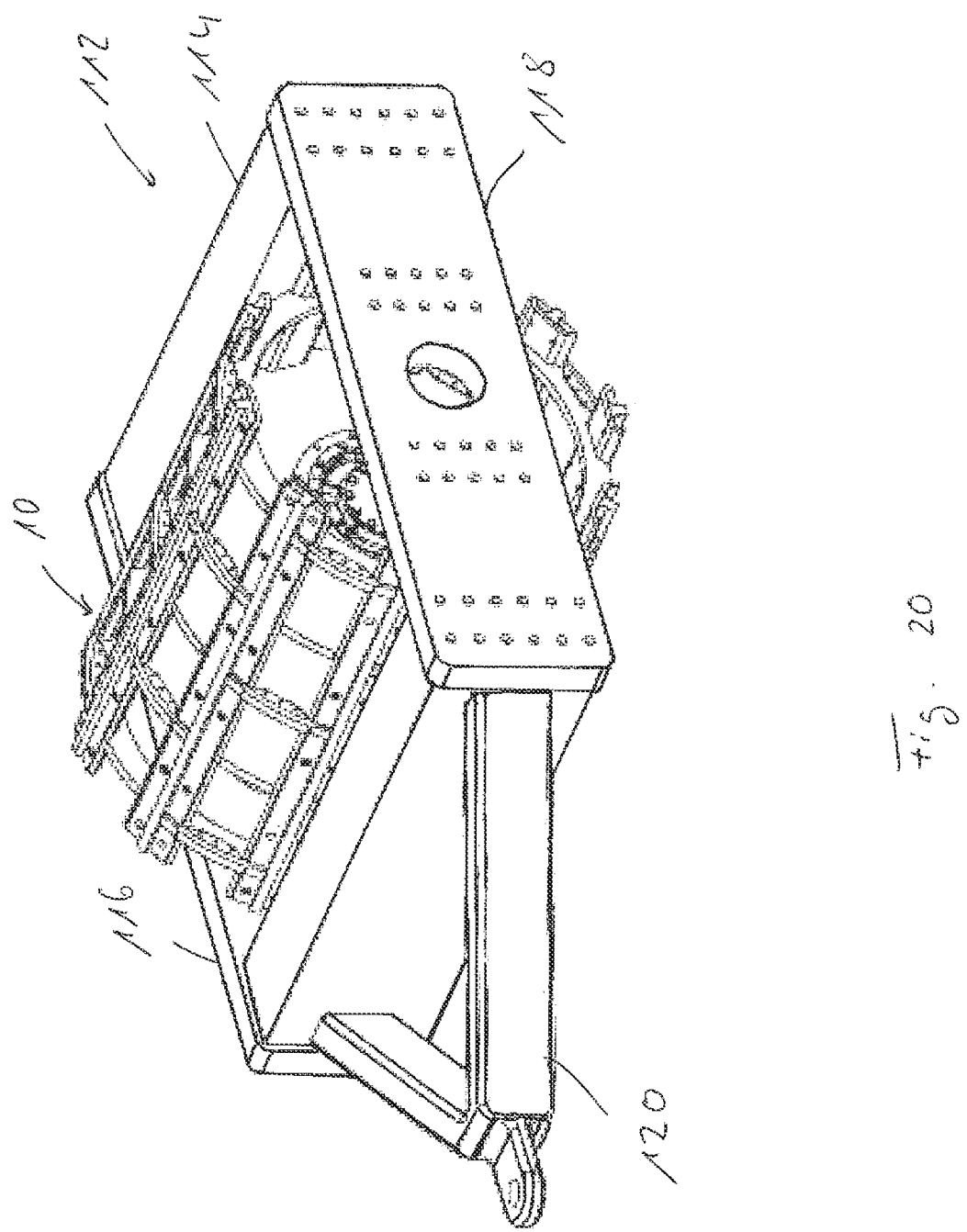

The present invention is subsequently described in detail with respect to the enclosed figures. As shown in:

FIG. 1 an earth working roller in a perspective view;

FIG. 2 the earth working roller from FIG. 1 in an axial view;

FIG. 3 the earth working roller from FIG. 1 in a radial view;

FIG. 4 a perspective view corresponding to FIG. 1 of an alternatively designed earth working roller;

FIG. 5 the earth working roller from FIG. 4 in an axial view;

FIG. 6 a longitudinal sectional view of the earth working roller from FIG. 5, cutaway along a line VI-VI in FIG. 5;

FIG. 7 a radial view of the earth working roller from FIG. 5 with earth working tools applied thereon;

FIG. 8 an axial view of the earth working roller from FIG. 7;

FIG. 9 a perspective view of the earth working roller from FIG. 7;

FIG. 10 a partial axial view of the earth working roller from FIG. 7 with the earth working tools partially detached therefrom;

FIG. 11 an earth working roller rolling on a substrate to be processed;

FIG. 12 a perspective view of an earth working roller with earth working troughs provided on the outer periphery of a roller body with roller tools supported on tool holders;

FIG. 13 a partial axial view of the earth working roller from FIG. 12 with an earth working trough detached therefrom;

FIG. 14 a perspective view of an earth working roller with earth working troughs provided on the outer periphery of a roller body;

FIG. 15 a partial axial view of the earth working roller from FIG. 14 with an earth working trough detached therefrom;

FIG. 16 a perspective partial view of another alternatively configured earth working roller;

FIG. 17 a depiction of another alternatively configured earth working roller corresponding to FIG. 16;

FIG. 18 a self-propelled earth working machine with an earth working roller according to FIG. 9;

FIG. 19 a drive system for the vibration generating mechanism of the earth working roller of the earth working machine from FIG. 18;

FIG. 20 an earth working machine trailer with an earth working roller according to FIG. 9;

FIG. 21 a drive system for the vibration generating mechanism of the earth working roller of the earth working machine from FIG. 18.

FIGS. 1 through 3 show a first embodiment of an earth working roller generally designated with reference numeral 10 which may be used to crush a solid substrate, for example, a concrete substrate. Earth working roller 10 comprises in this embodiment a support structure 11 with a plurality of support disks 12, 14, 16, 18, 20 arranged in series in the direction of a roller axis of rotation A. Support disks 12, 14, 16, 18, 20 are basically configured as annular and are formed with a substantially circular contour on their outer periphery. Support disks 14, 16, 18 lying in the central region of earth working roller 10 are arranged surrounding a substantially cylindrical peripheral wall 22 of a housing generally designated with 24 and are secured on the outer surface of peripheral wall 22 by welding. Housing 24 is connected at both axial ends via an end wall 26 or 28. Earth working roller 10 is mounted in the region of said end walls 26, 28 to be rotatable about roller axis of rotation A on a machine frame of an earth working machine, subsequently described in greater detail. A vibration generating mechanism, likewise to be subsequently described in greater detail, is arranged in the interior of housing 24, and by means of which an oscillation, oriented preferably substantially orthogonal to roller axis of rotation A, generally also designated as a vibration, may be superimposed on a rolling movement of earth working roller 10 about roller axis of rotation A carried out in the earth working operation.

First earth working units 30 extending substantially in the direction of roller axis of rotation A are provided on the outer peripheral region of support disks 12, 14, 16, 18, 20. In the embodiment depicted in FIGS. 1 through 3, each earth working unit 30 comprises an earth working bar 32. Recesses, open radially outwardly are designed on the outer peripheral region of support disks 12, 14, 16, 18, 20 and are assigned to earth working bars 32 of first earth working unit 30, and earth working bars 32 are inserted into said recesses so that they project radially outwardly beyond the circular base outer periphery 34 of support disks 12, 14, 16, 18, 20 and thus, with a respective earth working region 37, may come into contact with the substrate to be processed. Earth working regions 37 may have, as is clear in the figures, for example, two processing edges formed by surfaces extending orthogonal to one another.

Earth working bars 32 are fixedly connected to support disks 12, 14, 16, 18, 20 by welding so that basically a skeletal structure of a roller body 36 open radially outward is provided, formed substantially using support disks 12, 14, 16, 18, 36, housing 24, and first earth working units 30 or earth working bars 32 of the same. It is thereby clear, in particular in FIGS. 1 and 3, that support disks 14, 20 provided in the respective axial end regions of roller body 36 are only connected via first earth working units 30 to roller body 36 or other support disks 14, 16, 18. In order to maintain access as freely as possible to end walls 26, 28 of housing 24, support disks 12, 20 may be formed with a larger opening provided in the interior region of the same than support disks 14, 16, 18 connected to peripheral wall 22 of housing 24.

In addition, second earth working units 38 are provided on support disks 12, 14, 16, 18, 20. In the embodiment shown, these are integral with support disks 12, 14, 16, 28, 20, thus designed as one piece, and comprise earth working projections 40 projecting radially outward beyond base outer periphery 34 of support disks 12, 14, 16, 18, 20. Said earth working projections extend in each case in the circumferential direction between two directly adjacent first earth working units 30 or earth working bars 32 of the same in such a way that they end edge-like at a circumferential spacing to the same. Earth working projections 40 preferably have a radial projection height beyond base outer periphery 34 of support disks 12, 14, 16, 18, 20 in such a way that they define the same outer radius as earth working bars 32 define with their earth working regions 37. Earth working projections 40, just like earth working regions 37 of earth working bars 32, thus contact a fictive cylindrical surface surrounding roller body 36. It is clear in FIG. 1, that for each support disk 12, 14, 16, 18, 20, one second earth working unit 38 is provided or no second earth working unit 38 is provided in alternation between two first earth working units 30 directly adjacent in the circumferential direction. A corresponding pattern is provided when viewed in the axial direction. In the direction of roller axis of rotation A for consecutive support disks 12, 14, 16, 18, 20, one second earth working unit 38 is provided or no second earth working unit 38 is provided in alternation between two respective first earth working units 30.

Due to the skeletal structure of roller body 36, open radially outward, an earth working roller 10 is provided with an inherently high stability yet at a comparatively low net weight. This means, that during generation of a vibration by a vibration generating mechanism arranged in housing 24, the mass of earth working roller 10 to be set into vibration is comparatively low, so that this vibration, thus, for example, a vibration movement or vibration acceleration, may be used very efficiently for impact-like crushing of the substrate upon which earth working roller 10 rolls.

One alternative embodiment of an earth working roller 10 is depicted in FIGS. 4 through 6. It is clear in FIGS. 4 through 6 that tool carriers 42 of the respective first earth working units 36 are provided sequentially in the circumferential direction and respectively formed as tray-like or trough-like and thus concave when viewed from a radially outward direction, on the outer peripheral region of support disks 12, 14, 16, 18, 20 arranged sequentially in the circumferential direction. Tool carriers 42 are fixedly connected to support disks 12, 14, 16, 18, 20 by welding.

Similarly, second earth working units 38, depicted in the embodiment from FIGS. 4 through 6, each comprise earth working projection support regions 44 on the outer peripheral region of support disks 12, 14, 16, 18, 20. A similar arrangement pattern is clear in this case, as was previously described. It is clear in FIG. 5, that one earth working projection support region 44 is provided or no earth working projection support region 44 is provided in alternation in the circumferential direction on each support disk 12, 14, 16, 18, 20 between two respective first earth working units 30 or trough-like tool carriers 42 of the same directly adjacent to one another in the circumferential direction, wherein a corresponding alternating arrangement is also realized in the axial sequence of support disks 12, 14, 16, 18, 20 between two respective tool carriers 42 of first earth working units 42 directly adjacent to one another in the circumferential direction.

FIGS. 7 through 10 show earth working roller 10, previously described with reference to FIGS. 4 through 6, with earth working bars 48 detachably applied on tool carriers 42 of first earth working units 36 and operating as earth working tools 46, just like in the embodiment of FIGS. 1 through 3. As is particularly clear in FIG. 10, earth working bars 48 are designed with a socket region 50 shaped with an expanding, for example, trapezoidal shape and an earth working region 52 projecting radially outward therefrom. To secure earth working bars 48 on respective tool carriers 42, fixing strips 54, 56 are used, which extend along earth working bar 50, and which are adapted on the one side to the profile of socket region 50 and on the other side to the concave profile of tool carrier 42 and thus in the mounted state, together with earth working bar 48 respectively clamped on tool carrier 42 by said fixing strips, substantially completely fill in the interior of concave tool carrier 42. Fixing strips 54, 56 may, for example, be secured on tool carriers 42 by screw bolts 58, by which means a stable clamping of earth working bars 48 is achieved. Earth working bars 48 and fixing strips 54, 56 assigned to the same preferably extend across the entire axial length of tool carrier 42.

Second earth working units 38, assigned to earth working projection support portion 44 provided on support disks 12, 14, 16, 18, 20, comprise earth working projection carriers 60 configured as arc shaped segments designed as separate components, which may encompass earth working projection support portion 44 in a U shape from radially outward. These are dimensioned, for example, such that they extend in each case completely between two earth working bars 48 or earth working regions 52 of the same directly adjacent in the circumferential direction and have an enlarged radial projection height in the circumferential spacing to earth working regions 52 and thus form earth working projections 62. In these regions with increased radial projection height, earth working projection carriers 60 designed as separate components preferably end at the same level, like earth working regions 52 of earth working bars 48.

Like fixing strips 54, 56, earth working projection carriers 60 of second earth working units 38 also designed as separate components may be secured on roller body 36, in particular on support disks 12, 14, 16, 18, 20, by screwing.

The embodiment previously described with reference to FIGS. 4 through 10 has the advantage that it facilitates an exchangeability of earth working bars 48 or earth working projection carriers 60 coming into contact with the substrate to be processed as a stable configuration. Due to this configuration, earth working bars 48 or earth working projection carriers 60 designed with different shapes may also be easily provided on roller body 36 so that an earth working roller 10 designed thusly may be easily adapted to different applications.

FIG. 11 illustrates how an earth working roller 10 provided with the preceding structure enters into interaction with substrate 64 to be worked. It is clear on the one hand that there, where earth working bars 32 or 48 come into contact with substrate 64 with their respective earth working regions 37 or 52, fracture lines $L_1$ arise extending substantially transverse to movement direction R of earth working roller 10, and which extend substantially uninterrupted across the entire axial extension length of earth working roller 10. In movement direction R, fracture lines $L_2$ always arise, extending in each case between two fracture lines $L_1$, where earth working projections 40 or 62, arranged axially and radially alternating, come into contact with substrate 64. Thus, substrate 64, thus, for example, a concrete substrate to be broken up, is broken into a plurality of sheet portions P lying offset to one another, which may then be comparatively easily removed by another earth working machine, for example a backhoe or the like. For example, first and second earth working units 30, 38 may be distributed across the outer periphery of earth working roller 10 such that a maximum mutual spacing of fracture lines $L_1$ of 50-70 cm is created, while the mutual spacing of fracture lines $L_2$ is approximately double the spacing of fracture lines $L_1$. Segments are thus generated that may be easily supplied for further processing.

FIGS. 12 and 13 illustrate that roller body 36, as previously described with reference to FIGS. 4 through 10, may also be used in other ways. In particular, earth working shells 66 may be provided as earth working tools 46 extending in the direction of roller axis of rotation A, preferably across the entire length of earth working roller 10 or of roller body 36, on tool carriers 42 of first earth working units 30. These are preferably dimensioned such that they each extend in the circumferential direction across three tool carriers 42 in such a way that they engage halfway into a respective tool carrier 42 using a tool carrier engagement region 68, 70 respectively provided on a peripheral end region, wherein tool carrier engagement regions 68, 70 are adapted to the concave shape of tool carrier 42 so that the tool carrier engagement regions of two earth working shells 66 consecutively following one another in the circumferential direction together completely fill in one of concave tool carriers 42, and are secured thereon by screw bolts 72. In one central region in the circumferential direction, earth working shells 66 have another tool carrier engagement region 74, which is positioned and shaped so that it substantially completely fills in or completely contacts one tool carrier 42 completely straddled by a respective earth working shell 66 in the circumferential direction. In this way, an increased supporting stability of earth working shells 66 is guaranteed.

Roller body 36 is completely closed toward the outside by earth working shells 66 arranged consecutively following one another in the circumferential direction. In the embodiment depicted in FIGS. 12 and 13, multiple interchangeable holders 76 are secured on the outer side of earth working shells 66, for example, by welding. Roller tools 78, in the example depicted, chisels 80, may be detachably inserted into interchangeable holders 76 so that, on the one hand, a corresponding exchange may be carried out to replace roller tools 78 with other roller tools, for example, tamping feet or the like, and on the other hand, worn roller tools may be replaced by new roller tools.

FIGS. 14 and 15 show a configuration in which no tool holders or roller tools or other formations are provided on earth working shells 66 on the outer side. Earth working shells 66 thus form a substantially smooth configuration, closed in the circumferential direction, so that an earth working roller 10 designed thusly may be used, for example, for compacting a substrate. This shows the high variability of an earth working roller 10, which is designed with a skeletal roller body 36, basically open radially outwardly, with tool carriers 42 of first earth working units 30 provided thereon. In the configuration, previously described with reference to FIGS. 12 through 15, in which earth working shells 66 are connected on an outer periphery of a roller body 36 designed in this way, earth working projection support regions 44 of second earth working units 38 are substantially not used or merely function for radial support of the regions extending thereabove of earth working shells 66.

Earth working shells 66 depicted in FIGS. 12-15 may also be configured in another way. For example, bar-like roller tools may be secured on the outer surface of earth working shells 66, for example, by welding or screwing or the like. These types of roller tools may, for example, be arranged extending in a zig-zag course in the circumferential direction about the roller axis of rotation, or may extend in a circular ring shape about the roller axis of rotation and/or may extend substantially in the direction of the roller axis of rotation. Furthermore, earth working shells 66 themselves may have an open structure, for example, a grid-like structure in which openings are formed between a plurality of struts forming this open structure. These struts forming the grid-like structure may extend running partially in the circumferential direction, in the direction of the roller axis of rotation or obliquely thereto, and may themselves be effective or designed as roller tools, or may be designed as tool carriers on which additional roller tools coming into contact with the substrate to be processed may be secured by screwing.

FIGS. 16 and 17 show alternative embodiment variants of support structure 11 of roller body 36 in a sectional view. In FIG. 16, for example, it is clear in conjunction with support disk 14, that this comprises a plurality of segments 14a, 14b, 14c, 14d, 14e, which each are arranged spaced circumferentially apart from one another and respectively support in their radially outer region two first earth working units 30 or earth working bars 32 of the same. The other support disks, in particular support disks 16, 18 fixedly connected to peripheral wall 22 of housing 24, may also be designed in this type of segmented way.

In the embodiment depicted in FIG. 17, support structure 11 is constructed using, for example, a plurality of support struts 35 extending, for example, substantially radially, and likewise connected to peripheral wall 22 of housing 24. These may, for example, be provided following one another annularly in the circumferential direction where the support disks connected to peripheral wall 22 are positioned in the previously described embodiment; however, they may equally be arranged at other axial positions and axially offset to one another.

First earth working units 30, for example, earth working bars 32 of the same, or also previously described tool carriers 42, extending in the radial direction, are secured on the radially outer end regions of support struts 35, e.g., by welding. Second earth working units 38 are provided in the circumferential direction between support struts 35 or first earth working units 30 connected thereto. These may, as in the case of support disk 12, be combined into a ring and may be connected on the one side to the radially outer ends of support struts 35, for example, by welding, and on the other side may support first earth working units 30. Alternatively, segments 39 may be provided between support struts 35 or first earth working units 30, consecutively following one another in the circumferential direction, of which, for example, each second segment 39 in the circumferential direction has an earth working projection 40 projecting radially outward. The distribution of segments 39 having respective earth working projections 40 may be as previously described. Thus, a sequence of segments 39 having earth working projections 40 and segments 39 having no earth working projections 40 may be provided both in the circumferential direction as well as in the axial direction. In the meaning of the present invention, segments 39 may thus replace the regions of the support disks positioned there in the previously described embodiments and may completely take over their functionality. In particular, it might also be provided that second earth working units 38 comprise earth working projections designed as separate components or tools and may then be secured on segments 39 designed for accommodating the same as earth working projection carriers.

FIG. 17 further illustrates that reinforcing struts may be provided for increasing the stability of support struts 35 and optionally connected to housing 24. Thus, reinforcing struts 51 may be provided, which, for example, fixedly connect adjacent support struts 35 running in the circumferential direction to one another. As illustrated by way of reinforcing struts S2 and S3, multiple struts of this type may also be positioned staggered in the radial direction. Reinforcing struts S4, S5 show that a cross-wise or intersecting arrangement is also possible. Reinforcing strut S6 shows that, in particular, the axial end regions of first earth working units 30, which axially project beyond housing 24, may be supported relative to housing 24 by reinforcement struts so that, optionally support disk 12 visible there may be omitted.

Reference is made to the fact that these types of reinforcing struts may be provided assigned to all support struts 35 or earth working units, wherein different configurations of reinforcing struts may be provided assigned to different support struts. Support structure 11 may also comprise a combination of support disks and support struts or reinforcing struts in order to achieve a further increased rigidity of roller body 36 in this way.

FIG. 18 shows an earth working machine, generally designated with 92, on which an earth working roller 10, designed according to the invention, is used, for example, with the structure explained in FIGS. 4 through 10. The earth working machine, basically designed according to a type of soil compactor, comprises wheels 84, driven by a drive unit (not shown) on a rear end 82 for forward movement of earth working machine 80. A control platform 86, in which an operating person may be accommodated for operating earth working machine 92, is additionally provided on rear end 82. A front end 88 comprises a machine frame 90, articulately connected to rear end 82, on which earth working roller 10 is rotatably mounted between two supports 94, 96. As previously already set forth, this rotatable connection may be carried out, for example, via end walls 26, 28 of housing 24 provided in the central region of earth working roller 10.

FIG. 19 illustrates a vibration generating mechanism 98 arranged in the interior of earth working roller 10, in particular in the interior of housing 24. Said vibration generating mechanism comprises in the example depicted two unbalanced masses 100, 102 which are mounted on an unbalanced shaft 104 to be rotatable about an unbalanced axis of rotation U substantially corresponding to roller axis of rotation A. An unbalanced drive motor 106 may, for example, be arranged in the interior of housing 24 or may be mounted on one of two end walls 26, 28. In the example depicted, unbalanced drive motor 106 is designed as a hydraulic motor, which is supplied with hydraulic fluid via a hydraulic pump 108. Hydraulic pump 108, which preferably has a variable delivery rate, may, for example, be driven by a drive unit 110 of earth working machine 92, for example, an auxiliary drive of drive unit 110; however, it may also basically be driven by a drive unit designed separately from the drive unit provided for the traction drive of earth working machine 10. Basically, hydraulic pump 108 may also be integrated into the hydraulic circuit basically provided on earth working machine 92, or may represent the same so that, for example, when using corresponding valve units, unbalanced drive motor 106 may be supplied with pressurized fluid in a suitable way in earth working operation.

An alternative embodiment variant of an earth working machine 112 is depicted in FIG. 20. Earth working machine 112 from FIG. 20 is an earth working machine trailer, which does not have its own traction drive. Earth working machine 112 comprises a machine frame 114 with two supports 116, 118 rotatably supporting earth working roller 10. Earth working machine 112 may be coupled via a trailer drawbar 120 to a towing vehicle, for example, a tractor, a soil compactor, a bulldozer or another construction machine, in order to be pulled or pushed by the same and thereby moved across the substrate to be processed.

Reference is made to the fact that a hydraulically and/or mechanically acting transmission mechanism may be provided on this type of earth working machine trailer 112, via which transmission mechanism earth working roller 10 may be driven to rotate by coupling to a drive unit of towing vehicle 124. Even though a torque may be transferred to earth working roller 10 via the transmission mechanism in this type of configuration, in the meaning of the present invention, this type of earth working machine trailer 112, in which the energy for transferring a torque to earth working roller 10 is provided by a drive unit provided on towing vehicle 124, is basically not considered to be a self-propelled earth working machine, but instead is considered to be an earth working machine trailer, as this type of earth working machine may not be operated without coupling to the towing vehicle providing the drive energy.

In order to be able to use an earth working roller 10 with a vibration generating mechanism 98 assigned to the same in the design of an earth working machine 112 depicted in FIG. 18, hydraulic pump 108, as depicted in principle in FIG. 21, may be mechanically coupled to an auxiliary output shaft 122 of a drive unit of a towing machine 124 functioning as the traction drive or to another power take off shaft of towing machine 124. Hydraulic circuit 109 comprising pump 108 and hydraulic motor 106 is thereby preferably provided completely on earth working machine 112. Hydraulic pump 108 is driven by auxiliary output shaft 122, wherein this is designed with a variable delivery rate in order to be able to adjust the amount of hydraulic fluid conveyed in this way and thus also to adjust the speed of hydraulic motor 106. In one alternative embodiment, a separate drive unit 126 may be provided, assigned to hydraulic pump 108 or to vibration generating mechanism 98, which may be used for operating hydraulic pump 108 and thus vibration generating mechanism 98 independently from the drive unit provided for the traction drive of towing machine 124. This drive unit 126 may, for example, be provided on earth working machine 112 together with hydraulic circuit 109, so that the energy required for driving vibration generating mechanism 98 may be generated at earth working machine 112 itself and may be transferred to this mechanism.

Finally, reference is made to the fact that the previously described earth working roller may be varied in the most varied aspects, without deviating from the principles of the present invention. Thus, for example, earth working bars extending in the direction of the roller axis of rotation, just like the tool carriers of the first earth working units, might also be arranged spaced apart from one another and/or be provided as segments lying offset from one another in the circumferential direction. Also, the support disks, designed substantially with a circular outer peripheral contour, might be designed as polygons in order to achieve a contour approximating a circular shape in this way. It is important for a substantially uniform rolling movement, that the earth working regions of the earth working units coming into contact with the substrate lie approximately on a common cylindrical surface.

To process the substrate, the earth working units or the earth working regions of the same may be designed with different contours. Thus, these edged contours visible in the figures may have an approximately rectangular cross section. Alternatively, the or at least some of the earth working regions may be designed with a tapered, thus wedge-like contour.

The invention claimed is:

1. An earth working roller comprising a support structure, wherein to form a roller body rotatable about a roller axis of rotation on a radially outer region of the support structure, a plurality of first earth working units is provided extending substantially in a direction of the roller axis of rotation,
wherein the support structure comprises a plurality of support disks arranged consecutively in the direction of the roller axis of rotation and connected to one another to form the roller body, wherein the plurality of first earth working units extending substantially in the direction of the roller axis of rotation is provided on an outer peripheral region of at least one part of the support disks,
wherein the support structure is arranged surrounding a peripheral wall of a housing for a vibration generating mechanism and is connected to the peripheral wall, and
wherein the vibration generating mechanism with at least one unbalanced mass rotatable about an unbalanced axis of rotation is arranged in the housing, and/or wherein the housing is closed by an end wall in at least one axial end region, and
wherein, in at least one axial end region of the roller body, at least one support disk is connected to the support disks arranged surrounding the peripheral wall by at least one part of the first earth working units.

2. The earth working roller according to claim 1, wherein the roller body is designed as substantially open radially outward in its outer peripheral region.

3. The earth working roller according to claim 1, wherein at least one part of the support disks is designed with a substantially circular outer peripheral contour, and/or wherein at least one part of the support disks comprises a plurality of support disk segments arranged spaced circumferentially apart from one another.

4. The earth working roller according to claim 1, wherein the support structure comprises a plurality of support struts supporting in their radially outer region the plurality of first earth working units extending substantially in the direction of the roller axis of rotation and/or supporting in their radially outer region a plurality of second earth working units extending substantially in a circumferential direction provided on an outer peripheral region of at least one part of the support disks.

5. The earth working roller according to claim 1, wherein at least one part of the support disks is arranged surrounding the peripheral wall of the housing, wherein the support disks arranged surrounding the peripheral wall are fixedly connected to the peripheral wall, and/or wherein the support disks arranged surrounding the peripheral wall are fixedly connected to the peripheral wall by welding.

6. The earth working roller according to claim 1, wherein the unbalanced axis of rotation substantially corresponds to roller axis of rotation, and/or wherein an unbalanced drive motor assigned to the at least one unbalanced mass is arranged on an end wall.

7. The earth working roller according to claim 1, wherein at least one first earth working unit comprises an earth working bar fixedly connected to the support structure.

8. The earth working roller according to claim 7, wherein each first earth working unit comprises an earth working bar, and/or wherein a plurality of earth working bars is arranged spaced circumferentially apart from one another.

9. The earth working roller according to claim 1, wherein at least one first earth working unit comprises an earth working bar fixedly connected to the support structure, and wherein the at least one earth working bar is fixedly connected to all support disks and/or wherein the at least one earth working bar is fixedly connected to at least a part of the support disks by welding.

10. The earth working roller according to claim 1, wherein at least one first earth working unit comprises a tool carrier fixedly connected to the support structure, and wherein an earth working tool is detachably connected or connectable to at least one tool carrier.

11. The earth working roller according to claim 10, wherein each first earth working unit comprises a tool carrier, and/or wherein at least one tool carrier has a concave contour with respect to the outer periphery of the roller body, and/or wherein a plurality of tool carriers is arranged spaced circumferentially apart from one another.

12. The earth working roller according to claim 10, wherein at least one earth working tool is designed as an earth working bar.

13. The earth working roller according to claim 12, wherein the earth working bar comprises a socket region designed for securing on a tool carrier and an earth working region projecting radially outward from the socket region for an earth working tool mounted on a tool carrier.

14. The earth working roller according to claim 13, wherein at least one earth working tool is connected or connectable in its socket region by screwing and/or clamping to a tool carrier.

15. The earth working roller according to claim 10, wherein at least one earth working tool comprises an earth working shell positioned or positionable surrounding the support structure radially outwardly, and connected or connectable to at least two tool carriers.

16. The earth working roller according to claim 6, wherein a plurality of earth working shells consecutively following one another in the circumferential direction is connected or connectable to a tool carrier in both peripheral end regions respectively, and/or wherein at least one earth working shell is connected or connectable to the at least two tool carriers by screwing.

17. The earth working roller according to claim 15, wherein at least one roller tool is mounted on at least one earth working shell, and/or wherein at least one earth working shell is designed with a grid-like structure.

18. The earth working roller according to claim 17, wherein at least one roller tool is mounted on each earth working shell, and/or wherein a plurality of roller tools is mounted on at least one earth working shell, and/or wherein at least one interchangeable holder is fixedly connected to at least one earth working shell and at least one roller tool is detachably connected or connectable to the at least one interchangeable holder.

19. The earth working roller according to claim 18, wherein at least one roller tool comprises a chisel, and/or wherein at least one roller tool comprises a tamping foot.

20. The earth working roller according to claim 15, wherein at least one earth working shell has in at least one peripheral end region a tool carrier engagement region adapted to a concave contour of a tool carrier.

21. The earth working roller according to claim 1, wherein at least one first earth working unit comprises a tool carrier fixedly connected to the support structure, and wherein an earth working tool is detachably connected or connectable to at least one tool carrier, and
wherein the at least one tool carrier is fixedly connected to each support disk, and/or wherein the at least one tool carrier is fixedly connected to at least one part of the support disks by welding.

22. The earth working roller according to claim 1, wherein at least one earth working shell is positioned or positionable surrounding all support disks radially outwardly in a peripheral region, and
wherein at least one earth working tool comprises an earth working shell positioned or positionable surrounding the support structure radially outwardly, and connected or connectable to at least two tool carriers.

23. An earth working machine, comprising at least one earth working roller according to claim 1 mounted on a machine frame to be rotatable about the roller axis of rotation.

24. The earth working machine according to claim 23, wherein the earth working machine is designed as a trailer machine and does not have a traction drive.

25. The earth working machine according to claim 24, wherein the earth working machine is to be hydraulically and/or mechanically coupled to a drive engine to provide the drive energy for a vibration generating mechanism provided in the at least one earth working roller.

26. The earth working machine according to claim 24, wherein a drive unit is provided on the earth working machine to provide the drive energy for a vibration generating mechanism provided in the at least one earth working roller.

27. The earth working machine according to claim 23, wherein the earth working machine is self-propelled and has a traction drive.

28. The earth working machine according to claim 27, wherein a drive unit of the traction drive is provided to provide the drive energy for a vibration generating mechanism provided in the at least one earth working roller, or wherein a drive unit is provided on the earth working machine for the traction drive and a drive unit, designed separately from the drive unit for traction drive, is provided for the vibration generating mechanism of the at least one earth working roller.

29. The earth working roller according to claim 1, wherein a plurality of second earth working units is provided extending substantially in a circumferential direction, and
wherein the plurality of second earth working units extending substantially in the circumferential direction is provided on an outer peripheral region of at least one part of the support disks.

30. The earth working roller according to claim 1, wherein the at least one support disk connected to the support disks surrounding the peripheral wall by the at least one part of the first earth working units is arranged to not surround the peripheral wall of the housing and/or is arranged axially spaced apart from the housing.

31. The earth working roller according to claim 1, wherein the at least one support disk is only connected to the support disks surrounding the peripheral wall by the at least one part of the first earth working unit.

32. The earth working roller according to claim 29, wherein at least one second earth working unit comprises at least one earth working projection projecting radially outward on the support structure between at least two first earth working units consecutively following one another in the circumferential direction.

33. The earth working roller according to claim 32, wherein for at least one second earth working unit, the at least one earth working projection has a circumferential spacing to the first earth working units accommodating said second earth working unit between themselves in the circumferential direction.

34. The earth working roller according to claim 29, wherein at least one second earth working unit comprises at least one earth working projection projecting radially outward on the support structure between at least two first earth working units consecutively following one another in the circumferential direction, and
wherein at least one second earth working unit comprises at least one earth working projection projecting radially outward on at least one support disk between at least two first earth working units consecutively following one another in the circumferential direction.

35. The earth working roller according to claim 34, wherein at least one second earth working unit comprises at least one earth working projection on each support disk.

36. The earth working roller according to claim 34, wherein, for at least one support disk, no second earth working unit is provided between at least two first earth working units consecutively following one another in the circumferential direction.

37. The earth working roller according to claim 36, wherein, for at least one support disk, one second earth working unit is provided and no second earth working unit is provided in alternation between first earth working units consecutively following one another in the circumferential direction.

38. The earth working roller according to claim 37, wherein, for support disks consecutively following one another in the direction of the roller axis of rotation, one second earth working unit is provided between first earth working units consecutively following one another in the circumferential direction on one of support disks and no second earth working unit is provided on the other support disk.

39. The earth working roller according claim 34, wherein, for at least one second earth working unit, at least one earth working projection forms an integral component of a support disk.

40. The earth working roller according to claim 34, wherein at least one second earth working unit comprises at least one earth working projection carrier detachably connected or connectable to a support disk.

41. The earth working roller according to claim 40, wherein at least one second earth working unit comprises an earth working projection support portion on an outer peripheral region of a support disk, and wherein an earth working projection carrier is connected or connectable to said support disk in the earth working projection support portion by screwing.

42. An earth working roller comprising a support structure, wherein to form a roller body rotatable about a roller axis of rotation on a radially outer region of the support structure, a plurality of first earth working units is provided extending substantially in a direction of the roller axis of rotation, wherein the support structure comprises a plurality of support disks arranged consecutively in the direction of the roller axis of rotation and connected to one another to form the roller body, wherein the plurality of first earth working units extending substantially in the direction of the roller axis of rotation is provided on an outer peripheral region of at least one part of the support disks, wherein the support structure is arranged surrounding a peripheral wall of a housing for a vibration generating mechanism and/or is connected to the peripheral wall, wherein the vibration generating mechanism with at least one unbalanced mass rotatable about an unbalanced axis of rotation is arranged in the housing, and/or wherein the housing is closed by an end wall in at least one axial end region, and wherein at least one first earth working unit comprises a tool carrier fixedly connected to the support structure, and wherein an earth working tool is detachably connected or connectable to at least one tool carrier.

43. An earth working roller comprising a support structure, wherein to form a roller body rotatable about a roller axis of rotation on a radially outer region of the support structure, a plurality of first earth working units is provided extending substantially in the direction of the roller axis of rotation and a plurality of second earth working units is provided extending substantially in the circumferential direction, wherein the support structure comprises a plurality of support disks arranged consecutively in the direction of the roller axis of rotation and connected to one another to form the roller body, wherein the plurality of first earth working units extending substantially in the direction of the roller axis of rotation is provided on an outer peripheral region of at least one part of the support disks and the plurality of second earth working units extending substantially in the circumferential direction is provided on an outer peripheral region of at least one part of the support disks, wherein the support structure is arranged surrounding a peripheral wall of a housing for a vibration generating mechanism and/or is connected to the peripheral wall, wherein the vibration generating mechanism with at least one unbalanced mass rotatable about an unbalanced axis of rotation is arranged in the housing, and/or wherein the housing is closed by an end wall in at least one axial end region, and wherein at least one second earth working unit comprises at least one earth working projection projecting radially outward on the support structure between at least two first earth working units consecutively following one another in the circumferential direction.

44. An earth working machine, comprising at least one earth working roller mounted on a machine frame to be rotatable about the roller axis of rotation comprising a support structure, wherein to form a roller body rotatable about a roller axis of rotation on a radially outer region of the support structure, a plurality of first earth working units is provided extending substantially in a direction of the roller axis of rotation, wherein the support structure comprises a plurality of support disks arranged consecutively in the direction of the roller axis of rotation and connected to one another to form the roller body, wherein the plurality of first earth working units extending substantially in the direction of the roller axis of rotation is provided on an outer peripheral region of at least one part of the support disks, wherein the support structure is arranged surrounding a peripheral wall of a housing for a vibration generating mechanism and is connected to the peripheral wall, wherein the vibration generating mechanism with at least one unbalanced mass rotatable about an unbalanced axis of rotation is arranged in the housing, and/or wherein the housing is closed by an end wall in at least one axial end region, wherein the earth working machine is self-propelled and has a traction drive, and wherein a drive unit of the traction drive is provided to provide the drive energy for a vibration generating mechanism provided in the at least one earth working roller, or wherein a drive unit is provided on the earth working machine for the traction drive and a drive unit, designed separately from the drive unit for traction drive, is provided for the vibration generating mechanism of the at least one earth working roller.

* * * * *